US011543142B1

(12) United States Patent
Karimi et al.

(10) Patent No.: US 11,543,142 B1
(45) Date of Patent: Jan. 3, 2023

(54) SYSTEMS AND METHODS FOR OPERATION OF A CLIMATE CONTROL SYSTEM

(71) Applicant: Trane International Inc., Davidson, NC (US)

(72) Inventors: Behrooz Karimi, Tyler, TX (US); Youssef A. Jaber, Tyler, TX (US); Wayne N. Kraft, Tyler, TX (US)

(73) Assignee: Trane International Inc., Davidson, NC (US)

( * ) Notice: Subject to any disclaimer, the term of this patent is extended or adjusted under 35 U.S.C. 154(b) by 153 days.

(21) Appl. No.: 16/725,919

(22) Filed: Dec. 23, 2019

(51) Int. Cl.
| | |
|---|---|
| F24F 11/30 | (2018.01) |
| F24F 11/56 | (2018.01) |
| F24F 11/61 | (2018.01) |
| F24F 11/64 | (2018.01) |
| F24F 11/74 | (2018.01) |
| F24F 11/80 | (2018.01) |
| F24F 11/83 | (2018.01) |
| F24F 11/86 | (2018.01) |
| G05B 19/042 | (2006.01) |
| F24F 11/52 | (2018.01) |
| F24F 110/10 | (2018.01) |
| F24F 120/10 | (2018.01) |
| F24F 120/20 | (2018.01) |
| F24F 140/60 | (2018.01) |

(52) U.S. Cl.
CPC ............. *F24F 11/30* (2018.01); *F24F 11/52* (2018.01); *F24F 11/56* (2018.01); *F24F 11/61* (2018.01); *F24F 11/64* (2018.01); *F24F 11/74* (2018.01); *F24F 11/80* (2018.01); *F24F 11/83* (2018.01); *F24F 11/86* (2018.01); *G05B 19/042* (2013.01); *F24F 2110/10* (2018.01); *F24F 2120/10* (2018.01); *F24F 2120/20* (2018.01); *F24F 2140/60* (2018.01); *G05B 2219/2614* (2013.01)

(58) Field of Classification Search
CPC .. F24F 11/30; F24F 11/80; F24F 11/83; F24F 11/74; F24F 11/86; F24F 11/61; F24F 2140/60
See application file for complete search history.

(56) References Cited

U.S. PATENT DOCUMENTS

| | | | |
|---|---|---|---|
| 5,172,563 A | * | 12/1992 | Fujii ..................... F25B 49/022 62/158 |
| 7,130,719 B2 | | 10/2006 | Ehlers et al. |
| 9,638,431 B2 | | 5/2017 | Frader-Thompson et al. |
| 9,645,589 B2 | | 5/2017 | Leen et al. |

(Continued)

*Primary Examiner* — Mohammad Ali
*Assistant Examiner* — Vincent W Chang
(74) *Attorney, Agent, or Firm* — Womble Bond Dickinson (US) LLP

(57) ABSTRACT

Climate control systems and related methods and systems therefore a disclosed. In an embodiment, the climate control system includes a heat exchanger configured to discharge conditioned air to an indoor space. In addition, the climate control system includes a display and a controller coupled to the display. The controller is to generate an operation selection option on the display. The operation selection option includes a plurality of selections for operating of the climate control system based on operational efficiency or occupant comfort within the indoor space. The controller is to adjust a temperature of the heat exchanger relative to a user selection from the plurality of selections.

23 Claims, 5 Drawing Sheets

(56) References Cited

U.S. PATENT DOCUMENTS

| | | | |
|---|---|---|---|
| 10,337,747 | B2 | 7/2019 | Nordberg et al. |
| 2006/0086117 | A1* | 4/2006 | Lee ................... B60H 1/3211 62/229 |
| 2007/0043478 | A1 | 2/2007 | Ehlers et al. |
| 2008/0307811 | A1* | 12/2008 | Bryan .................. F25B 49/025 62/228.3 |
| 2012/0253592 | A1* | 10/2012 | Senthil ............... G05D 23/1931 62/227 |
| 2014/0039692 | A1* | 2/2014 | Leen ...................... F24F 11/62 700/278 |
| 2014/0318159 | A1* | 10/2014 | Eisenhour ........... B60H 1/3211 62/89 |
| 2017/0115025 | A1* | 4/2017 | Mowris ................ F24H 9/2064 |
| 2017/0234562 | A1* | 8/2017 | Ribbich ............. G05D 23/1923 700/277 |
| 2018/0267701 | A1 | 9/2018 | Rigg et al. |
| 2018/0373278 | A1* | 12/2018 | Walser ................. F24F 3/0442 |
| 2019/0271495 | A1* | 9/2019 | Wang ..................... F24D 15/04 |
| 2019/0323717 | A1* | 10/2019 | Xu ........................... F24F 11/70 |
| 2021/0071888 | A1* | 3/2021 | Mowris ................... F24F 11/88 |
| 2021/0084835 | A1* | 3/2021 | Bowling ................... A01G 9/24 |

* cited by examiner

US 11,543,142 B1

SYSTEMS AND METHODS FOR OPERATION OF A CLIMATE CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

A climate control system (e.g., a heating, ventilation, and air conditioning—HVAC—system, furnace, etc.) may be operated to cool and/or heat an indoor space (e.g., a residential house, office, storage compartment, etc.). Such systems may utilize available utilities to power their operation, such as, for example, electrical power and/or fuel (e.g., natural gas). Thus, while the operation of such a climate control system may provide or promote maximum comfort within the indoor space, this occupant comfort typically comes at the cost of lower operating efficiency, and thus, higher operating costs (e.g., via higher utility costs).

BRIEF SUMMARY

Some embodiments disclosed herein are directed to a climate control system. In an embodiment, the climate control system includes a heat exchanger configured to discharge conditioned air to an indoor space. In addition, the climate control system includes a display, and a controller coupled to the display. The controller is to generate an operation selection option on the display. The operation selection option includes a plurality of selections for operating of the climate control system based on operational efficiency or occupant comfort within the indoor space. The controller is to adjust a temperature of the heat exchanger relative to a user selection from the plurality of selections.

Other embodiments disclosed herein are directed to a method of operating a climate control system. In an embodiment, the method includes generating an operation selection option on a display. The operation selection option includes a plurality of selections for operating a climate control system based on operational efficiency or occupant comfort within an indoor space. In addition, the method includes receiving a selection from the plurality of selections. Further, the method includes adjusting a temperature of a heat exchanger of the climate control system relative to the selection from the plurality of selections. The heat exchanger is to discharge conditioned air into the indoor space.

Still other embodiments disclosed herein are directed to a non-transitory machine-readable medium including instructions that, when executed by a processor, cause the processor to: (a) generate an operation selection option on a display, wherein the operation selection option includes a plurality of selections for operating a climate control system based on operational efficiency or occupant comfort within an indoor space; and (b) adjust a temperature of a heat exchanger of a climate control system relative to a user selection from the plurality of selections, such that: the processor is to adjust the temperature of the heat exchanger to a first temperature if a user makes a first selection from the plurality of selections; and the processor is to adjust the temperature of the heat exchanger to a second temperature if the user makes a second selection from the plurality of selections.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
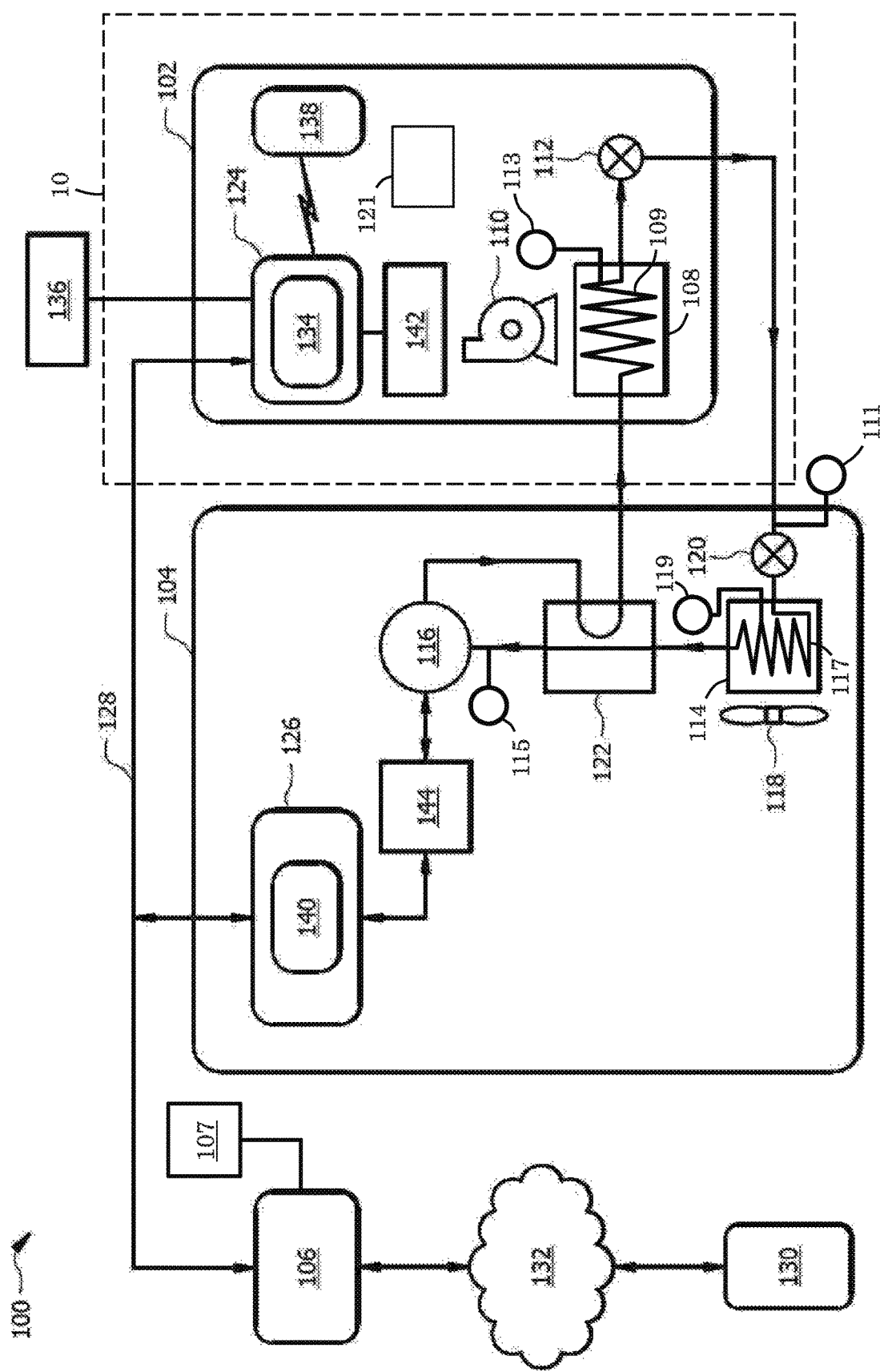
FIG. 1 is a diagram of a climate control system configured for operating in a heating mode according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

As previously described, operation of a climate control system may enhance the comfort of an indoor space, but often does so at the cost of higher operational expenses (e.g., due to higher utilities consumption). Various operational parameters or functions of a climate control system may be controlled so as to either promote efficient operation or comfortable conditions within the indoor space. However, many of these operational parameters are non-intuitive and are interrelated (so that changes in one parameter may affect others), and thus a typical occupant/user of the climate control system lacks sufficient understanding of such systems to make suitable choices to result in the desired operation (e.g., efficient operation, comfort-based operation, or a combination thereof). As a result, a skilled technician is often utilized to alter various operating parameters within a climate control system so as to provide the desired operational performance. However, the reliance on a skilled technician for making such changes to a climate control system operation is inefficient from the user/occupant's perspective, and therefore minimizes interactions or changes to the system operation throughout the operating life of the climate control system.

Accordingly, embodiments disclosed herein include systems and methods for operating a climate control system so as to provide an untrained, occupant or user of the climate control system, the ability to make desired changes to the operational parameters or controls of the system so as to promote efficient operation, comfort, or a combination or balance thereof. In some embodiments, the systems and methods may allow a user to make a relatively small number of intuitive selections that then trigger or actuate a plurality of operational changes within the climate control system all with a mind toward prioritizing the user's desired operational mode (e.g., again efficient operation, comfortable operation, a combination, etc.).

Referring now to FIG. 1, a schematic diagram of a climate control system 100 for controlling a climate within an indoor space 10 according to some embodiments is shown. In this embodiment, climate control system 100 is a heat pump system. Most generally, climate control system 100 may be selectively operated to implement one or more substantially closed thermodynamic refrigeration cycles to provide a heating functionality (hereinafter "heating mode") and/or a cooling functionality (hereinafter "cooling mode"). As will be described in more detail below, the embodiments disclosed herein may be utilized or incorporated within a variety of different climate control system types (e.g., other than heat pump systems, such as in the case of climate control system 100 in FIG. 1). Thus, it should be appreciated that reference to climate control system 100, is not intended to limit the other types of climate control systems in which the embodiments disclosed herein may be applied (e.g., non-heat pump air conditioning systems, gas furnace, electrical heater, hydronic system, etc.).

The climate control system 100 generally comprises an indoor unit 102, an outdoor unit 104, and a system controller 106 that may generally control operation of the indoor unit 102 and/or the outdoor unit 104. The indoor unit 102 may generally be located within an indoor space 10, while the outdoor unit 104 may generally be located outside of the indoor space 10. In some embodiments, some or all of the components of the indoor unit 102 may be located outside of the indoor space 10. Thus, the arrangement of indoor unit 102 and outdoor unit 104 (and/or any other component of climate control system 100) relative to the indoor space 10 is merely indicative of some embodiments, and should not be interpreted as limiting against other potential arrangements in other embodiments.

Indoor unit 102 generally comprises an indoor air handling unit comprising an indoor heat exchanger 108, an indoor fan 110, an indoor metering device 112, and an indoor controller 124. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. Specifically, indoor heat exchanger 108 may include a coil 109 (which may comprise a single or multiple coils or tubes) for channeling the refrigerant therethrough that segregates the refrigerant from any air flowing through indoor heat exchanger 108 during operations. In some embodiments, the indoor heat exchanger 108 may comprise a plate-fin heat exchanger. However, in other embodiments, indoor heat exchanger 108 may comprise a microchannel heat exchanger and/or any other suitable type of heat exchanger.

The indoor fan 110 may generally comprise a centrifugal blower comprising a blower housing, a blower impeller at least partially disposed within the blower housing, and a blower motor configured to selectively rotate the blower impeller. The indoor fan 110 may generally be configured to provide airflow through the indoor unit 102 and/or the indoor heat exchanger 108 (specifically across or over the coil 109) to promote heat transfer between the airflow and a refrigerant flowing through the coil 109 of the indoor heat exchanger 108. The indoor fan 110 may also be configured to deliver temperature-conditioned air from the indoor unit 102 to one or more areas and/or zones of an indoor space 10. The indoor fan 110 may generally comprise a mixed-flow fan and/or any other suitable type of fan. The indoor fan 110 may generally be configured as a modulating and/or variable speed fan capable of being operated at many speeds over one or more speed ranges. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, however, the indoor fan 110 may be a single speed fan.

The indoor metering device 112 may generally comprise an electronically-controlled motor-driven electronic expansion valve (EEV). In some embodiments, however, the indoor metering device 112 may comprise a thermostatic expansion valve, a capillary tube assembly, and/or any other suitable metering device. In some embodiments, while the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

Outdoor unit 104 generally comprises an outdoor heat exchanger 114, a compressor 116, an outdoor fan 118, an outdoor metering device 120, a reversing valve 122, and an outdoor controller 126. In some embodiments, the outdoor unit 104 may also comprise a plurality of temperature sensors for measuring the temperature of the outdoor heat exchanger 114, the compressor 116, and/or the outdoor ambient temperature. The outdoor heat exchanger 114 may generally be configured to promote heat transfer between a refrigerant carried within internal passages of the outdoor heat exchanger 114 and an airflow that contacts the outdoor heat exchanger 114 but that is segregated from the refrigerant. Specifically, outdoor heat exchanger 114 may include a coil 117 (which may comprise a single or multiple coils or tubes) for channeling the refrigerant therethrough that segregates the refrigerant from any air flowing through outdoor heat exchanger 114 during operations. In some embodiments, outdoor heat exchanger 114 may comprise a plate-fin heat exchanger. However, in other embodiments, outdoor heat exchanger 114 may comprise a spine-fin heat exchanger, a microchannel heat exchanger, or any other suitable type of heat exchanger.

The compressor 116 may generally comprise a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiments, the compressor 116 may comprise a rotary type compressor configured to selectively pump refrigerant at a plurality of mass flow rates. In some embodiments, however, the compressor 116 may comprise a modulating compressor that is capable of operation over a plurality of speed ranges, a reciprocating-type compressor, a single speed compressor, and/or any other suitable refrigerant compressor and/or refrigerant pump. In some embodiments, the compressor 116 may be controlled by a compressor drive controller 144, also referred to as a compressor drive and/or a compressor drive system.

The outdoor fan 118 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 (specifically across or over the coil 117) to promote heat transfer between the airflow and a refrigerant flowing through the coil 117 of outdoor heat exchanger 114. The outdoor fan 118 may generally be configured as a modulating and/or variable speed fan capable of being operated at a plurality of speeds over a plurality of speed ranges. In other embodiments, the outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. In yet other embodiments, the outdoor fan 118 may be a single speed fan. Further, in other embodiments, the outdoor fan 118 may comprise a mixed-flow fan, a centrifugal blower, and/or any other suitable type of fan and/or blower.

The outdoor metering device 120 may generally comprise a thermostatic expansion valve. In some embodiments, however, the outdoor metering device 120 may comprise an electronically-controlled motor driven EEV similar to indoor metering device 112, a capillary tube assembly, and/or any other suitable metering device. In some embodiments, while the outdoor metering device 120 may be configured to meter the volume and/or flow rate of refrigerant through the outdoor metering device 120, the outdoor metering device 120 may also comprise and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally comprise a four-way reversing valve. The reversing valve 122 may also comprise an electrical solenoid, relay, and/or other device configured to selectively move a component of the reversing valve 122 between operational positions to alter the flow path of refrigerant through the reversing valve 122 and consequently the climate control system 100. Additionally, the reversing valve 122 may also be selectively controlled by the system controller 106 and/or an outdoor controller 126.

The system controller 106 may generally be configured to selectively communicate with an indoor controller 124 of the indoor unit 102, an outdoor controller 126 of the outdoor unit 104, and/or other components of the climate control system 100. In some embodiments, the system controller 106 may be configured to control operation of the indoor unit 102 and/or the outdoor unit 104. In some embodiments, the system controller 106 may be configured to monitor and/or communicate, directly or indirectly, with a plurality of sensors associated with components of the indoor unit 102, the outdoor unit 104, etc. The sensors may measure or detect a variety of parameters, such as, for example, pressure, temperature, and flow rate of the refrigerant as well as pressure and temperature of other components or fluids of or associated with climate control system 100. In some embodiments, the climate control system 100 may include a sensor (or plurality of sensors) for sensing or detecting the ambient outdoor temperature. Additionally, in some embodiments, the system controller 106 may comprise a temperature sensor and/or may further be configured to control heating and/or cooling of zones associated with the climate control system 100 (e.g., within the indoor space). In some embodiments, the system controller 106 may be configured as a thermostat, having a temperature sensor and user interface, for controlling the supply of conditioned air to zones associated within the climate control system 100.

In some embodiments, climate control system 100 may include a pressure sensor 111 configured to sense or detect a pressure of the refrigerant upstream of outdoor metering device 120 and downstream of indoor heat exchanger 108 (that is when climate control system 100 is operated in the heating mode as shown in FIG. 1 and described in more detail below). In addition, climate control system 100 may include a pressure sensor 115 configured to sense or detect a pressure of the refrigerant at the suction side of the compressor 116. In some embodiments, the pressure sensors 111, 115 may be coupled to or included within outdoor unit 104. Further, climate control system 100 may include a temperature sensor 113 configured to sense or detect a temperature of the coil 109 of the indoor heat exchanger 108 and a temperature sensor 119 configured to sensor or detect a temperature of the coil 117 of outdoor heat exchanger 114. In some embodiments, the temperature of the coils 109, 117 (e.g., the temperature measured by sensors 113, 119, respectively) may comprise the external temperature of the coils 109, 117, the temperature of the refrigerant flowing through the coils 109, 117, or a combination thereof. In some embodiments, the material forming coils 109, 117 may be thermally conductive, so that a temperature of the refrigerant flowing within coils 109, 117 may be the same, substantially the same, or relatively close to the temperature of the coils 109, 117 themselves. Each of the sensors 111, 113, 115, 119 may be coupled to system controller 106 (e.g., either directly or through one of the indoor controller 124 and outdoor controller 126) through a suitable communication path (which may be any suitable wired communication path, wireless communication path, or a combination thereof). In some embodiments, one or more of the sensors 111, 113, 115, 119 are omitted from the climate control system 100.

The system controller 106 may also be in communication with an input/output (I/O) unit 107 (e.g., a graphical user interface, a touchscreen interface, or the like) for displaying information and for receiving user inputs. The I/O unit 107 may display information related to the operation of the climate control system 100 (e.g., from system controller 106) and may receive user inputs related to operation of the climate control system 100. During operations, I/O unit 107 may communicate received user inputs to the system controller 106, which may then execute control of climate control system 100 accordingly. Communication between the I/O unit 107 and system controller 106 may be wired, wireless, or a combination thereof. In some embodiments, the I/O unit 107 may further be operable to display information and receive user inputs tangentially and/or unrelated to operation of the climate control system 100. In some embodiments, however, the I/O unit 107 may not comprise a display and may derive all information from inputs from remote sensors and remote configuration tools (e.g., remote computers, servers, smartphones, tablets, etc.). In some embodiments, system controller 106 may receive user inputs from remote configuration tools, and may further communicate information relating to climate control system 100 to I/O unit 107. In these embodiments, system controller 106 may or may not also receive user inputs via I/O unit 107.

In some embodiments, the system controller 106 may be configured for selective bidirectional communication over a communication bus 128. In some embodiments, portions of the communication bus 128 may comprise a three-wire connection suitable for communicating messages between the system controller 106 and one or more of the climate control system 100 components configured for interfacing with the communication bus 128. Still further, the system controller 106 may be configured to selectively communicate with climate control system 100 components and/or any other device 130 via a communication network 132. In some embodiments, the communication network 132 may comprise a telephone network, and the other device 130 may comprise a telephone. In some embodiments, the communication network 132 may comprise the Internet, and the other device 130 may comprise a smartphone and/or other Internet-enabled mobile telecommunication device. In other embodiments, the communication network 132 may also comprise a remote server.

The indoor controller 124 may be carried by the indoor unit 102 and may generally be configured to receive information inputs, transmit information outputs, and/or otherwise communicate with the system controller 106, the outdoor controller 126, and/or any other device 130 via the communication bus 128 and/or any other suitable medium of communication. In some embodiments, the indoor controller 124 may be configured to communicate with an indoor personality module 134 that may comprise information related to the identification and/or operation of the indoor unit 102. In some embodiments, the indoor controller 124 may be configured to receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

The indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may also be configured to communicate with the outdoor metering device 120 and/or otherwise affect control over the outdoor metering device 120.

The outdoor controller 126 may be carried by the outdoor unit 104 and may be configured to receive information inputs, transmit information outputs, and/or otherwise communicate with the system controller 106, the indoor controller 124, and/or any other device 130 via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the climate control system 100, a position of the indoor metering device 112, and/or a position of the outdoor metering device 120. The outdoor controller 126 may further be configured to communicate with and/or control a compressor drive controller 144 that is configured to electrically power and/or control the compressor 116.

System controller 106, indoor controller 124, outdoor controller 126, compressor drive controller 144, indoor fan controller 142, indoor EEV controller 138, and I/O unit 107 may each comprise any suitable device or assembly which is capable of receiving electrical (or other data) signals and transmitting electrical (or other data) signals to other devices. In particular, while not specifically shown, controllers 106, 124, 126, 138, 142, 144, and I/O unit 107 may each include a processor and a memory. The processors (e.g., microprocessor, central processing unit, or collection of such processor devices, etc.) may execute machine readable instructions (e.g., non-transitory machine-readable instructions) provided on the corresponding memory to provide the processor with all of the functionality described herein. The memory of each controller 106, 124, 126, 138, 142, and 144 may comprise volatile storage (e.g., random access memory), non-volatile storage (e.g., flash storage, read only memory, etc.), or combinations of both volatile and non-volatile storage. Data consumed or produced by the machine readable instructions can also be stored on the memory of controllers 106, 124, 126, 138, 142, 144, and I/O unit 107.

During operations, system controller 106 may generally control the operation of climate control system 100 through the indoor controller 124, outdoor controller 126, compressor drive controller 144, indoor fan controller 142, and indoor EEV controller 138 (e.g., via communication bus 128). In the description below, specific control methods are described (e.g., method 200). It should be understood that the features of these described methods may be performed (e.g., wholly or partially) by system controller 106, and/or by one or more of controllers 124, 126, 144, 142, 138 as directed by system controller 106. As a result, the controller or controllers of climate control system 100 (e.g., controllers 106, 124, 126, 142, 144, 138, etc.) may include and execute machine-readable instructions (e.g., non-volatile machine-readable instructions) for performing the operations and methods described in more detail below. In some embodiments, each of the controllers 106, 124, 126, 138, 142, and 144 may be embodied in a singular control unit, or may be dispersed throughout the individual controllers 106, 124, 126, 138, 142, and 144 as described above.

As shown in FIG. 1, the climate control system 100 is configured for operating in a so-called heating mode in which heat may generally be absorbed by refrigerant at the outdoor heat exchanger 114 and rejected from the refrigerant at the indoor heat exchanger 108. Starting at the compressor 116, the compressor 116 may be operated to compress refrigerant and pump the relatively high temperature and high pressure compressed refrigerant through the reversing valve 122 and to the indoor heat exchanger 108. As the refrigerant flows through coil 109 of indoor heat exchanger 108, the refrigerant may transfer heat (and thus enthalpy) to an airflow that is passed through and/or into contact with the coil 109 by the indoor fan 110. After exiting the indoor heat exchanger 108, the refrigerant may flow through and/or bypass the indoor metering device 112, such that refrigerant flow is not substantially restricted by the indoor metering device 112. Refrigerant generally exits the indoor metering device 112 and flows to the outdoor metering device 120, which may meter the flow of refrigerant through the outdoor metering device 120, such that the refrigerant downstream of the outdoor metering device 120 is at a lower pressure than the refrigerant upstream of the outdoor metering device 120. From the outdoor metering device 120, the refrigerant may enter the outdoor heat exchanger 114. As the refrigerant is passed through coil 117 of outdoor heat exchanger 114, heat (and thus enthalpy) may be transferred to the refrigerant from an airflow that is passed through and/or into contact with the coil 117 of outdoor heat exchanger 114 by the outdoor fan 118. Refrigerant leaving the outdoor heat exchanger 114 may flow to the reversing valve 122, where the reversing valve 122 may be selectively configured to divert the refrigerant back to the compressor 116, where the refrigeration cycle may begin again.

Figure 2:
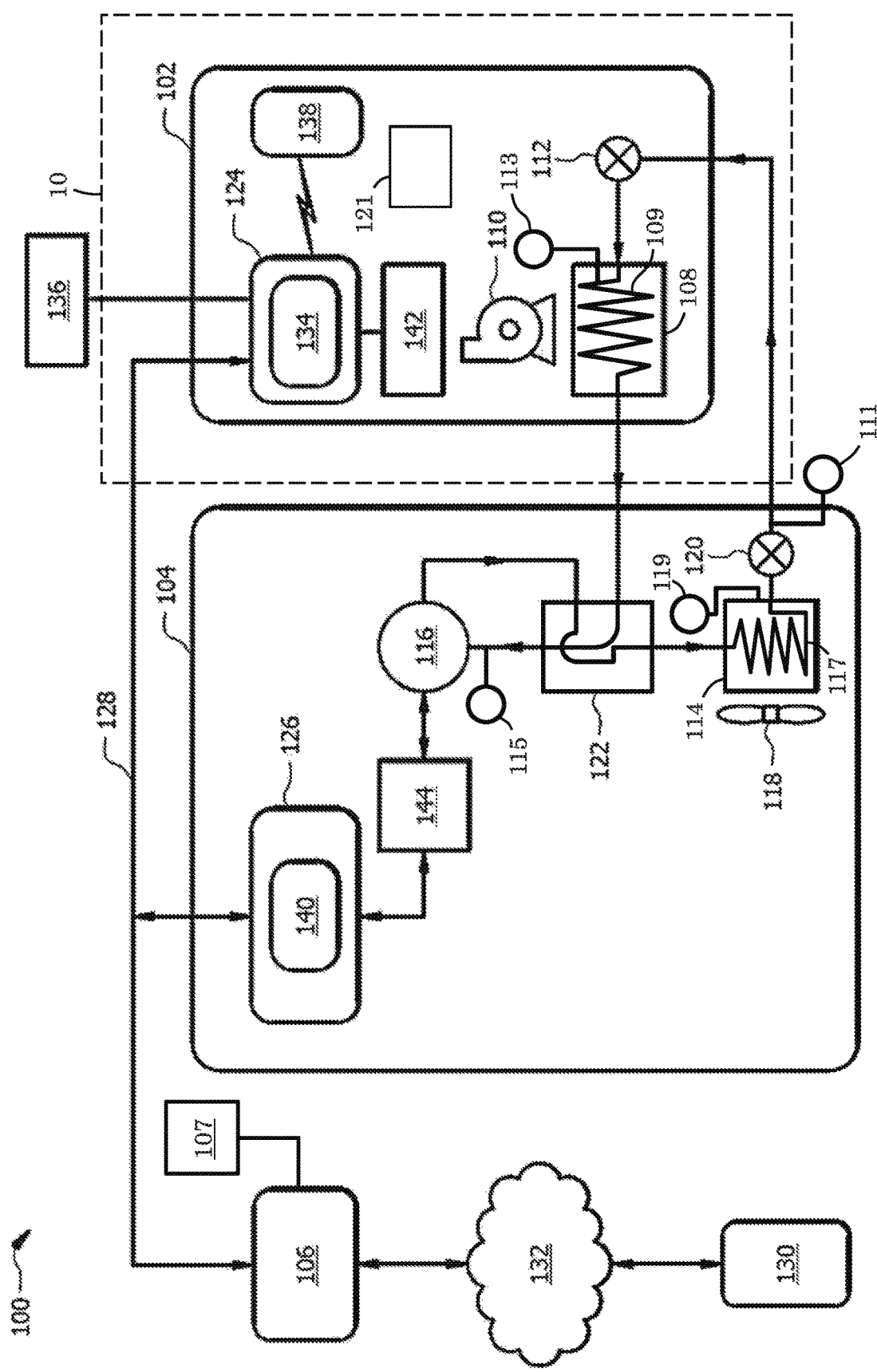
FIG. 2 is a diagram of the climate control system of FIG. 1 configured for operating in a cooling mode according to some embodiments.

Referring now to FIG. 2, climate control system 100 may be configured for operating in a so-called cooling mode. Most generally, the roles of the indoor heat exchanger 108 and the outdoor heat exchanger 114 are reversed as compared to their operation in the above-described cooling mode. For example, the reversing valve 122 may be controlled to alter the flow path of the refrigerant from the compressor 116 to the outdoor heat exchanger 114 first and then to the indoor heat exchanger 108, the indoor metering device 112 may be enabled, and the outdoor metering device 120 may be disabled and/or bypassed. In cooling mode, heat may generally be absorbed by refrigerant at the indoor heat exchanger 108 and rejected by the refrigerant at the outdoor heat exchanger 114. As the refrigerant is passed through the coil 109 of indoor heat exchanger 108, the indoor fan 110 may be operated to move air into contact with the coil 109, thereby transferring heat (and thus enthalpy) to the refrigerant from the air surrounding the indoor heat exchanger 108. Additionally, as refrigerant is passed through the coil 117 of outdoor heat exchanger 114, the outdoor fan 118 may be operated to move air into contact with coil 117, thereby transferring heat (and thus enthalpy) from the refrigerant to the air surrounding the outdoor heat exchanger 114.

In some embodiments, climate control system 100 may include additional or so-call auxiliary heating or cooling components 121 within the indoor unit 102 for transferring enthalpy to or from the air flowing to the indoor space 10 during operations. These auxiliary heating or cooling components 121 (or more simply "auxiliary components 121") may be used in lieu of or in addition to the indoor heat exchanger 108 during a heating operation and/or a cooling operation. Indeed, because the auxiliary components 1212 operate to transfer enthalpy to or from the air flowing to the indoor space, the auxiliary components 121 may also be referred to herein as "heat exchangers."

For example, in some embodiments, the auxiliary components 121 may be used to transfer additional enthalpy to the air flowing to indoor space 10 beyond that transferred to the air flow via the heat exchanger 108 during a heating operation. For instance, in these embodiments the auxiliary components 121 may comprise heat exchanger tubes or coils carrying hot combustion flue gases, such as, for instance, those produced by combusting natural gas or another suitable fuel. In addition, in some of these embodiments, the auxiliary heating components 121 may comprise one or more resistive coils that are energized with electric current to thereby cause an increase in their temperature. In either case, an air flow may be directed over these auxiliary components 121 in order to provide enthalpy transfer thereto. As previously described, the auxiliary components 121 may be coupled within indoor unit 102 so as to receive the air flow generated by indoor fan 110, either before or after the air flow is flowed across indoor coil 109 of indoor heat exchanger 108 as previously described. Thus, while not specifically shown, it should be appreciated that the auxiliary components 121 may be disposed within a housing of indoor unit 102 along with the coil 109 and indoor fan 110 in some embodiments.

As another example, in some embodiments, the climate control system 100 may not transfer enthalpy to the air flowing through the indoor space 10 via refrigerant flowing through coil 109 of indoor heat exchanger 108 (i.e., in some embodiment, the climate control system 100 may not be configured as a heat pump). In these embodiments, the refrigerant may be circulated through the climate control system 100 for purposes of cooling in the manner described above (see e.g., FIG. 2), but other heat exchange components (e.g., such as auxiliary components 121 described above) may be utilized to heat the air flowing to indoor space 10 during a heating mode operation. Thus, in these embodiments, the circulation of refrigerant through the climate control system 100 is in a single direction, and therefore the switching valve 122 is omitted. The other features of climate control system 100 may remain the same as previously described above.

In still other embodiments, auxiliary components 121 are utilized to transfer additional enthalpy away from the air flowing to the indoor space 10 during a cooling mode operation (e.g., either in addition to or in lieu of the enthalpy transfer accomplished via indoor heat exchanger 108 as previously described above). For instance, in some embodiments, the auxiliary components 121 may comprise a hydronic system that is to circulate cool or chilled water through a tube that is in contact with an airflow that is provided to the indoor space 10 (e.g., such as the air flow generated by indoor fan 110).

Regardless of the specific design of the climate control system (e.g., climate control system 100), as previously described, during operations, a heat exchanger (e.g., indoor heat exchanger 108, auxiliary components 121, etc.) is to cool or warm air that is then discharged to the indoor space (e.g., indoor space 10). Generally speaking, the air discharged from an indoor unit (e.g., indoor unit 102) of a climate control system to an indoor space (e.g., the air discharged from indoor heat exchanger 108 to indoor space 10) may be referred to herein as "conditioned air," regardless as to whether the climate control system is operating to cool or warm the indoor space (e.g., such as during a heating mode operation in FIG. 1 or a cooling mode operation in FIG. 2 as previously described above).

Figure 3:
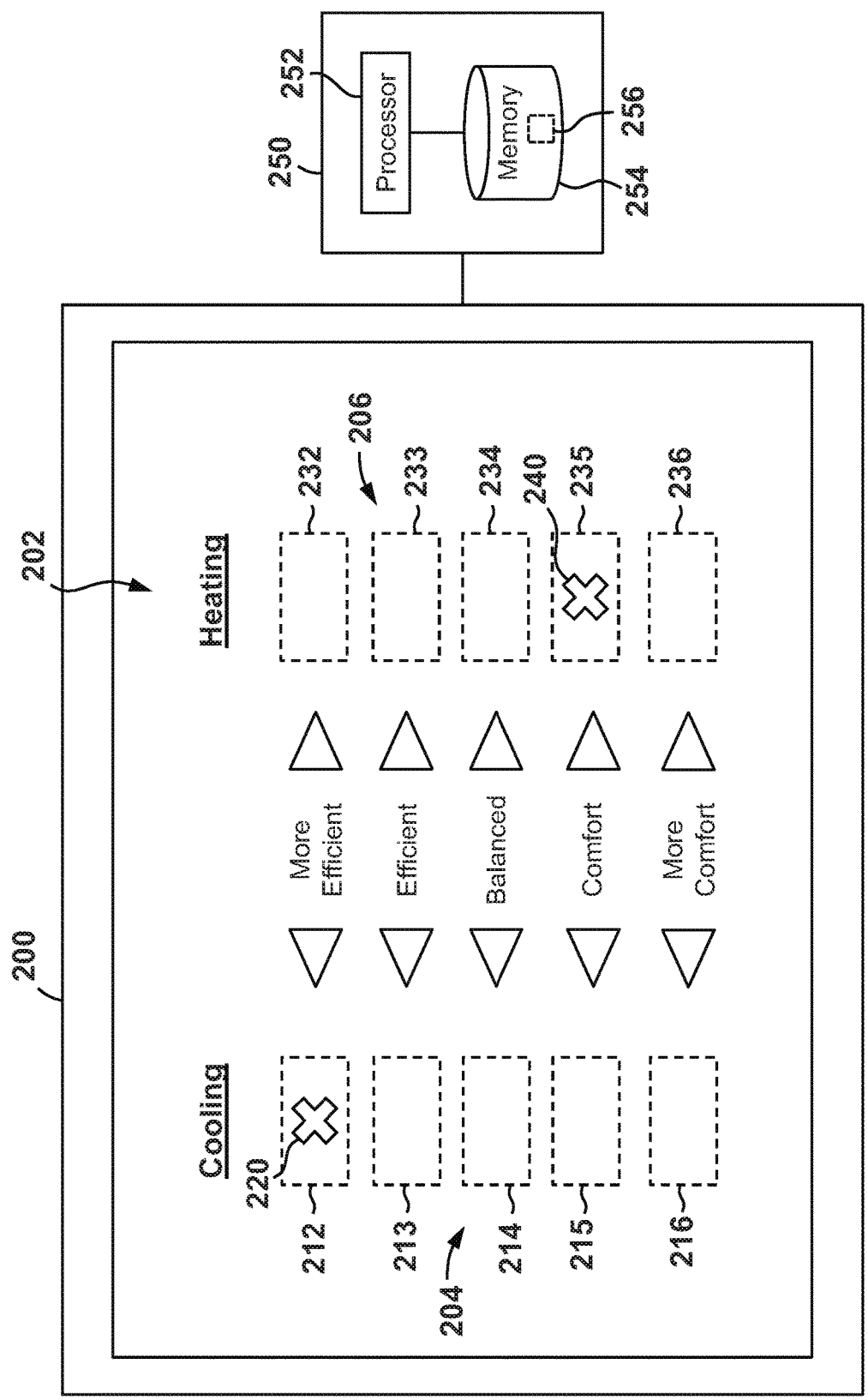
FIG. 3 is a schematic representation of a display and a menu selection associated with a climate control system operation according to some embodiments.

Referring now to FIGS. 1 and 3, a display 200 of climate control system 100 is shown. Display 200 may be an electronic display that is coupled to or incorporated within a thermostat or any other suitable device or portion of a climate control system 100 (e.g., such as system controller 106, I/O unit 107, device 130, etc.). In some examples, display 200 may comprises an electronic display device that is separate from the climate control system 100, such as, for instance, a computer monitor, tablet computer display, smartphone display, etc. (e.g., device 130 shown in FIGS. 1 and 2). Thus, during operations, display 200 may be incorporated within a component of climate control system 100 and/or may be in communication (e.g., via suitable electronic device(s)) with climate control system 100. In addition, in some embodiments display 200 may utilize any suitable display technology (e.g., liquid crystal display (LCD), organic light emitting diode (OLED) display, plasma display, electrophoretic display, etc.).

In particular, display 200 may be coupled to a controller 250. The controller 250 may be a controller or a combination of controllers coupled to or incorporated within climate control system 100 (e.g., such as one or more of the controllers 106, 124, 126, 142, 144, 138, I/O unit 107, etc.), and/or may comprise (e.g., at least partially) a dedicated controller that is separate and apart from climate control system 100. Regardless, controller 250 generally includes a processor 252, and a memory 254, which in some embodiments comprises a non-transitory machine-readable medium.

The processor 252 (e.g., microprocessor, central processing unit, or collection of such processor devices, etc.) executes machine-readable instructions 256 stored in memory 254, and upon executing the machine-readable instructions 256 on memory 254, performs some or all of the actions attributed herein to the processor 252, and/or the controller 250. The memory 254 may comprise volatile storage (e.g., random access memory (RAM)), non-volatile storage (e.g., flash memory, read-only memory (ROM)), or combinations of both volatile and non-volatile storage.

Generally speaking, during operations, controller 250 may generate graphics, information, or images (collectively referred to as "images") that relate to or correspond with the operational parameters or settings of a climate control system (e.g., climate control system 100). The images generated by the controller 250 may be projected to a user by the display 200. In addition, a user may make selections or inputs based on the images projected by display 200. For instance, a user may make touch inputs directly to display 200 (e.g., such as when display 200 is or includes a touch sensitive surface), and/or may provide inputs via some other suitable user input device (e.g., buttons, switches, voice commands, gestures, etc.) coupled to controller 250. User inputs received by the controller 250 (e.g., via display 200 or other user input device), may be communicated to suitable controller or controllers of a coupled climate control system 100 (e.g., controllers 106, 124, 126, 142, 144, 138 and/or I/O unit 107), so that the user inputs may cause or trigger changes in the operational parameters or controls of the climate control system 100 during operations.

Specifically, in FIG. 3, a selection menu 202 is shown or presented on display 200. Selection menu 202 provides a user of climate control system 100 with a cooling operation selection option 204 for affecting an operation of the climate control system 100 during a cooling mode (e.g., FIG. 2) and a heating operation selection option 206 for affecting an operation of the climate control system 100 during a heating mode (FIG. 1). The cooling operation selection option 204 includes a plurality of progressive selections 212, 213, 214, 215, 216. Similarly, the heating operation selection option 206 includes a plurality of progressive selections 232, 233, 234, 235, 236.

The selections 212, 213, 214, 215, 216 of selection option 204, and the selections 232, 233, 234, 235, 236 of selection option 206 are each associated with a particular operational scheme of the climate control system 100 for heating and cooling operations, respectively. Specifically, in the embodiment of FIG. 3, the selections 212, 213, 214, 215, and 216 are identified as "more efficient," "efficient," "balanced," "comfort," and "more comfort," respectively, for a cooling operation, and the selections 232, 233, 234, 235, and 236 are identified as "more efficient," "efficient," "balanced," "comfort," and "more comfort," respectively, for a heating operation. For each selection option 204, 206, an indicator 220, 240, respectively, is positioned so as to communicate the currently chosen selection during operations (e.g., 212, 214, 214, 215, 216, or the selections 232, 233, 234, 235, 236).

Generally speaking, a user may change the position of the indicators 220, 240 within selection options 204, 206, respectively, so as to choose a desired cooling and heating operational scheme for the climate control system 100. Each of the selections 212, 213, 214, 215, 216 and each of the selections 232, 233, 234, 235, 236 may be associated with different operational schemes for operating the climate control system 100 to promote or prioritize efficient operation, comfort within the indoor space, or a combination thereof.

Specifically, in the embodiment of FIG. 3, as previously described above, the selection 212 of selection option 204 and the selection 232 of selection option 206 may be associated or correspond with operation of the climate control system 100 for maximum efficiency during cooling and heating, respectively. Thus, when a user selects the "more efficient" selection 212 of selection option 204 or the "more efficient" selection 232 of selection option 206, the various operating parameters, modes, etc. of the climate control system 100 are chosen and/or adjusted so as to maximize the operational efficiency of the climate control system 100 during cooling mode or heating mode, respectively.

In addition, as is also previously described above, the selection 216 of selection option 204 and the selection 236 of selection option 206 may be associated or correspond with operation of the climate control system 100 for maximum comfort within the indoor space (e.g., indoor space 10) during cooling and heating, respectively. Thus, when a user selects the "more comfort" selection 216 of selection option 204 or the "more comfort" selection 236 of selection option 206, the various operating parameters, modes, etc. of the climate control system 100 are chosen and/or adjusted so as to maximize occupant comfort within the indoor space 10 during cooling mode or heating mode, respectively.

The intermediate selections 213, 214, 215 of selection option 204, and the intermediate selections 233, 234, 235 of selection option 206 may be associated or correspond with operation of the climate control system 100 for progressively balanced steps between maximum efficiency (e.g., at selections 212, 232) and maximum comfort (e.g., at selections 232, 236) during cooling and heating, respectively. Thus, when a user selects one of the intermediate selections 213-215 of selection option 204 or one of the intermediate selections 233-235 of selection option 206, the various operating parameters, modes, etc. of the climate control system 100 may be chosen and/or adjusted to promote the appropriate balance between maximum efficiency (e.g., at selections 212, 232) and maximum comfort (e.g., at selections 216, 236) as indicated by the relative position of the particular selection 213-215, 233-235 within selection options 204, 206, respectively.

In the following paragraphs, specific examples of the various control parameters, modes, etc. that are chosen, enabled, disabled, altered adjusted, etc. based on or relative to the user selection via the position of the indicators 220, 240 within selections options 204, 206, respectively, are discussed. It should be appreciated that in some embodiments, climate control system 100 may perform all (or substantially all) of the control methods/adjustments described below. However, in some embodiments, climate control system 100 may perform a portion (e.g., one or more) of the control methods/adjustments described below. In some cases, the specific control methods/adjustments that a climate control system performs (e.g., of those described below) may be dictated by the type and design of the climate control system and equipment included therein (e.g., heat pump system, gas furnace, electric heater, staged or variable heating or cooling systems, hydronic systems, etc.).

In addition, in some embodiments, the various control parameters, modes, etc. that are chosen, enabled, disabled, altered adjusted, etc. may be selected to adjust a balance between the latent and sensible capacity of the climate control system (e.g., at least during a cooling mode operation). Generally speaking, sensible capacity refers to the capacity needed from the climate control system 100 to achieve a desired change in temperature (e.g., dry bulb temperature) within the indoor space 10. Conversely, latent capacity refers to the capacity needed from the climate control system 100 to remove moisture (e.g., humidity) from the indoor space 10 during a cooling mode operation. In some instances, moisture removal (e.g., latent capacity) is associated with lower operating efficiency from the climate control system (e.g., because it may be associated with longer overall system run times, lower indoor coil temperatures, etc.). Thus, for at least cooling mode operations, a controller or controller of the climate control system 100 (e.g., one or more of the controllers 106, 124, 126, 142, 144, 138 and/or 250) may make changes to various control parameters, modes, etc. so as to selectively adjust the available latent capacity of the climate control system 10 (e.g., such that more latent capacity is provided as a user makes selections that emphasize occupant comfort over operational efficiency). However, it should be appreciated that the balance between sensible and latent capacity is only one potential theme or motivation for adjusting the various control parameters, modes, etc. of the climate control system relative the user selection within operations 204, and should not be interpreted as limiting all choices and adjustments of the various control parameters, modes, etc. described herein.

Conditioned Air Discharge Temperature

Referring now to FIGS. 1-3, in some embodiments, a user placement of the indicator 240 within selection option 206 may cause the climate control system 100 (e.g., via one or more of the controllers 106, 124, 126, 142, 144, 138 and/or 250), to alter or adjust the temperature of the conditioned air discharged to the indoor space 10 during a heating operation. In particular, during heating operation of the climate control system 100, air flowing over the coil 109 of indoor heat exchanger 108 is heated due to the circulation of warm or hot refrigerant within coil 109 as previously described. This heated air is then flowed to the indoor space 10 so as to increase a temperature therein. In some circumstances, an occupant of the indoor space 10 may have a higher level of comfort when the temperature of the discharge air is warmer; however, generally speaking, as the temperature of the conditioned air discharged to the indoor space 10 increases, the operational efficiency of the climate control system 100 decreases (e.g., because a higher amount of enthalpy is being transferred to a smaller volume of air flowing into the indoor space 10). Thus, a user selection along scale 230 to emphasize operational efficiency or occupant comfort may affect or determine whether and how the discharge air temperature is controlled during a heating operation.

In some embodiments each selection 232, 233, 234, 235, 236 may be associated with a desired discharge air temperature or air temperature rise across the indoor coil 109 during operations if climate control system 100 is in the heating mode (FIG. 1). The desired discharge air temperature (or desired temperature range) may generally and progressively increase as the indicator 240 is moved toward selections that prioritize occupant comfort over operational efficiency (e.g., as the indicator 240 moves away from selection 232 and toward selection 236), and may generally and progressively decrease as the indicator 240 is moved toward selections that prioritize operational efficiency over occupant comfort.

Specifically, in some embodiments, controller 250 may map some or all of the user selections 232, 233, 234, 235, 236 to corresponding discharge air temperatures (or corresponding discharge air temperature ranges) for the climate control system 100, or may map the user selections 232, 233, 234, 235, 236 to other values or parameters (or ranges thereof) that are related to or correspond with the discharge air temperature. For instance, in some embodiments the user selections 232, 233, 234, 235, 236 may be mapped (e.g., via controller 250 and/or any other controller of climate control system 100) to progressively higher values (or ranges) of the temperature of the coil 109 (or an equivalent or proxy thereof) during heating operations. Without being limited to this or any other theory, a temperature of the coil 109 may be directly related to the discharge air temperature during operations. For instance, in some embodiments, the discharge air temperature may be slightly less than the temperature of the coil 109, such as, for example, 12° F., 10° F., 5° F., etc. less in some embodiments. Thus, the temperature of coil 109 may provide the discharge air temperature, or a close approximation thereof.

The temperature of indoor coil 109 may be determined by directly measuring a temperature via sensor 113, or may be estimated by measuring a pressure of the refrigerant. For instance, in some embodiments, a pressure of the refrigerant may be measured by pressure sensor 111 and then converted to an associated condensing temperature. Specifically, the converted temperature at pressure sensor 111 may be referred to as a saturated discharge temperature (SDT) of the refrigerant. After appropriate offsets are applied (e.g., such as for pressure drop between coil 109 and pressure sensor 111), the SDT may provide a close approximation of or may be equivalent to the refrigerant condensing temperature while it was flowing within the indoor coil 109. Because the refrigerant may be maintained at its condensing temperature while flowing through (or at least most of) the coil 109, the condensing temperature may provide the temperature of coil 109 during operations.

In some embodiments, once a target temperature (or target temperature range) of indoor coil 109 is selected to provide the desired temperature for conditioned air discharged into indoor space 10, a controller or controllers of the climate control system (e.g., controllers 106, 124, 126, 142, 144, 138 and/or 250) may adjust various system parameters so as to maintain the desired discharge air temperature during the heating operation. For instance, during operations a speed of indoor fan 110 may be adjusted so as to adjust a corresponding speed of the air flowing across the indoor coil 109 during heating operations.

Without being limited to this or any other theory, adjusting (e.g., increasing and/or decreasing) the speed of indoor fan 110 and thus the speed of air flowing across coil 109, may also adjust an enthalpy transfer between the indoor coil 109 and the air flowing thereacross. Therefore, adjusting a speed of the air flowing across coil 109 may adjust the temperature of indoor coil 109 and thus also the temperature rise for airflow through indoor heat exchanger 108. Specifically, if all other parameters of the climate control system are held constant (e.g., compressor 116 speed, operation stage, etc.), increasing a speed of indoor fan 110 generally reduces both the temperature of coil 109 and the temperature rise for the air while it flows through the indoor heat exchanger 108, and decreasing the speed of indoor fan 110 generally increases both the temperature of coil 109 and the temperature rise for the air while it flows through the indoor heat exchanger 108. Thus, by adjusting the rate of air flowing across coil 109 (e.g., via adjustments of the speed of indoor fan 110), the discharge air temperature may be adjusted to or maintained at a desired level, which may be a function of the user's selection within selection option 206 (e.g., selections 232, 233, 234, 235, 236) as previously described.

However, it should be appreciated that other parameters or variables may be adjusted either in lieu of or in addition to the indoor fan 110 speed so as to maintain a desired discharge air temperature during operations. For instance, in some embodiments, a speed of the compressor 116 may be adjusted so as to adjust an enthalpy transfer between the refrigerant flowing within coil 109 and the airflow generated by indoor fan 110, and therefore a temperature of indoor coil 109. Specifically, as the speed of the compressor 116 increases during a heating mode operation, the flow rate of refrigerant through coil 109 also increases. Accordingly, the temperature of coil 109 may increase due to a reduced enthalpy transfer to the airflow across coil 109 per a unit volume of refrigerant flowing within coil 109. In addition, in some embodiments, for climate control systems that are not configured as a heat pump system as in climate control system 100, still other variables may be changed to adjust or maintain the temperature of the air discharged to indoor space 10 relative to a user's selection within the selection option 206. For instance, a flow rate of fuel (e.g., natural gas) to the burner assemblies within a gas-fired furnace may be increased or decreased to thereby increase or decrease, respectively, a temperature of the flue-gas carrying tubes. In addition, the amount of electric current provided to a coil or coils of an electric heater may be increased or decreased to thereby increase or decrease, respectively, the temperature of the resistive coil. Ultimately, the changes or controls utilized by the climate control system 100 are aimed at achieving and maintaining a desired discharge air temperature back into the indoor space 10 based upon and relative to the user's selection 232, 233, 234, 235, 236 of selection option 206 in FIG. 3 as previously described.

Referring specifically again to FIG. 3, in some embodiments, the selections 232, 233, 234, 235, 236 may be associated or mapped with progressively higher discharge air temperatures (or indoor coil temperatures, and/or SDTs, etc. as previously described). In some embodiments, a controller or controllers of the climate control system (e.g., controllers 106, 124, 126, 142, 144, 138 and/or 250) may simply enable or disable an increase (e.g., by a predetermined amount) of the discharge air temperature based on a user's selection within selection option 206. Specifically, in some embodiments, the selections 232, 233 may cause a controller or controllers of a climate control system to not adjust system parameters to achieve an elevated discharge air temperature, so as to increase operational efficiency, and the selections 234, 235, 236 may cause a controller or controllers of a climate control system to control for such an elevated discharge air temperature so as to generally increase occupant comfort. In some embodiments, a controller may apply a fixed and predetermined increase in the discharge air temperature (e.g., by a set decrease in the speed of indoor fan 110) when such a control operation is enabled (e.g., at selections 234, 235, 236 as mentioned above), or may control to provide progressively increasing discharge air temperatures depending on the specific selection 232, 233, 234, 235, 236 as previously described above.

Referring again to FIGS. 1-3, in some embodiments, a user placement of the indicator 220 within the selection option 204 may cause the climate control system 100 (e.g., via one or more of the controllers 106, 124, 126, 142, 144, 138 and/or 250), to alter or adjust the coil temperature of the indoor heat exchanger (e.g., indoor coil 109 of indoor heat exchanger 108) so as to ensure a desired temperature decrease of the air flow through the indoor heat exchanger 108 (and thus also a desired temperature of the conditioned air discharged to the indoor space 10) during a cooling operation. In general, during a cooling operation, as the temperature of coil 109 of indoor heat exchanger 108 decreases, the temperature of the conditioned air discharged to the indoor space 10 decreases and the amount of moisture condensed out of the air flowing through the indoor heat exchanger 108 increases. As a result, a rate of temperature change within indoor space 10 may increase as the temperature of coil 109 decreases (with other variables of the climate control system being fixed). However, a lower temperature of the coil 109 is also typically associated with higher rates of energy consumption within the climate control system and therefore lower operational efficiency, because generally less enthalpy is transferred to each unit volume of refrigerant flowing within the indoor coil so as to achieve a lower indoor coil temperature, and a generally higher volume of refrigerant is circulated through the indoor coil 109 during the cooling operations in order to achieve the desired indoor temperature. As previously described above, a temperature of the coil 109 may be reduced during a cooling mode operation by reducing a speed of the indoor fan 110 and/or increasing a speed of the compressor 116. Thus, user selections within selection option 204 that emphasize and promote operational efficiency of the climate control system (e.g., selections 212, 213, etc. and in some cases selection 214) may be associated with relatively higher desired values for the indoor coil temperature, and user selections within selection option 204 that emphasize and promote occupant comfort (e.g., selections 215, 216, etc. and in some cases selection 214) may be associated with relatively lower desired values for the indoor coil temperature.

Therefore, in some embodiments each selection 212, 213, 214, 215, 216 along scale 210 may be associated with a desired range or value of the temperature of indoor coil 109 during operations. The desired temperature or temperature range of coil 109 may generally and progressively decrease as the indicator 220 is moved toward selections that prioritize occupant comfort over operational efficiency (e.g., as the indicator 220 moves away from selection 212 and toward selection 216 within selection option 204). Specifically, in some embodiments, controller 250 may map some or all of the user selections 212, 213, 214, 215, 216 to corresponding temperatures (or temperature ranges) of the coil 109 for the climate control system 100, or may map the user selections 212, 213, 214, 215, 216 to other values or parameters that are related to or correspond with the indoor coil temperature (e.g., such as values that serve as a proxy for the temperature of coil 109). Thus, during operations, various system parameters and/or components may be adjusted so as to achieve or maintain a temperature of coil 109 (or proxy thereof) at a desired value or range based on a user's selection 212-216 within selection option 204 and the corresponding emphasis or prioritization of operational efficiency and/or occupant comfort.

For instance, in some embodiments, a pressure of the refrigerant may be measured or detected at any suitable location within climate control system 100 (e.g., within outdoor unit 104, indoor unit 102, etc.), and then the temperature of coil 109 may then be calculated or estimated based on known relationships and variables. Specifically, in some embodiments, pressure sensor 115 may measure a pressure of the refrigerant at the suction side of compressor 116. This measured pressure may be converted (e.g., via a look up table or suitable calculation, etc.) into a saturated suction temperature (SST) of the refrigerant at the measured pressure. As used herein, "saturation suction temperature" refers to the temperature at which the refrigerant boils/vaporizes within the evaporator coils for a given pressure. Thus, a derived value for SST may not reflect the actual temperature of the refrigerant at the suction of the compressor 116, but instead reflects the approximate phase change temperature of the refrigerant (e.g., vaporization temperature) at the measured pressure (e.g., as measured by sensor 115). During operation of climate control system 100 in the above described "cooling mode," (FIG. 2) the refrigerant is to change phase from liquid to a vapor as it absorbs heat energy from the air flowing across the coil 109. Thus, while the refrigerant is in the coil 109, it remains at (or substantially at) the vaporization temperature until all (or again substantially all) of the liquid refrigerant has vaporized. Thereafter, the refrigerant begins to increase in temperature above the vaporization temperature as additional heat energy is absorbed from the air flowing across the coil 109. This additional temperature increase is typically referred to as "superheat." Thus, the SST value of the refrigerant (which may be derived from the pressure of the refrigerant at the suction of compressor 116 via sensor 115 as previously described above), may provide the temperature of the refrigerant while it was flowing through the coil 109 (or during a majority of the time the refrigerant was flowing through the coil 109).

However, it should be noted that the pressure of the refrigerant at the suction side of the compressor 116 (e.g., the pressure measured by sensor 115) may be slightly lower than the pressure of the refrigerant within coil 109. This is driven by a number of factors (e.g., the length of the flow path between the coils, the relative diameters of flow paths within climate control system 100, etc.). As a result, the derived value of SST may be less than the actual vaporization temperature of the refrigerant when it was flowing within the coil 109 (i.e., the coil temperature). Therefore, in some embodiments, an offset may be applied to the derived value of SST based on a known (or estimated) pressure difference of the refrigerant between coil 109 and compressor 116 to thereby give the coil temperature. In some embodiments, the offset between SST and the final coil temperature may be 5° F. or less, such as, for instance 3° F. or less, or 2° F. or less, etc.

In some embodiments, once a target indoor coil temperature (e.g., of indoor coil 109) is selected to provide the desired temperature for conditioned air discharged into indoor space 10, a controller or controllers of the climate control system (e.g., controllers 106, 124, 126, 142, 144, 138 and/or 250) may adjust various system parameters so as to achieve or maintain the desired temperature (or temperature range) of coil 109 and thus also the desired discharge air temperature during the cooling operation. Generally speaking, the controller(s) of the climate control system may adjust various system parameters so as to adjust an enthalpy transfer rate between the refrigerant flowing within the coil 109 of indoor heat exchanger 108 and the airflow generated by indoor fan 110 during operations. For instance, during operations a speed of indoor fan 110 and/or a speed of the compressor 116 may be adjusted to maintain the desired indoor coil temperature during cooling operations.

Without being limited to this or any other theory, adjusting (e.g., increasing and/or decreasing) the indoor fan speed and/or the speed of the compressor 116, may essentially adjust an enthalpy transfer rate between the refrigerant in coil 109 and the airflow generated by indoor fan 110 as previously described above. As is also previously described above, the enthalpy transfer between the airflow generated by indoor fan 110 and the refrigerant within coil 109 directly relates to or affects the temperature of coil 109 and the conditioned air discharged from indoor heat exchanger 108 to indoor space 10 during operations. Namely, as the enthalpy transfer between the airflow generated by indoor fan 100 and the refrigerant within coil 109 decreases during a cooling mode operation, the temperature of the coil 109 also generally decreases, so as to decrease the temperature of the conditioned air discharged into the indoor space 10.

Referring specifically again to FIG. 3, in some embodiments, the selections 212, 213, 214, 215, 216 may be associated or mapped with progressively lower indoor coil temperatures (or SSTs as previously described). In some embodiments, the selections 212, 213, 214, 215, 216 may be associated or mapped with progressively lower indoor coil temperature ranges (that may or may not overlap for adjacent selections 212, 213, 214, 215, 216). In particular, in some embodiments, each selection 212, 213, 214, 215, 216 may be associated with a range of indoor coil temperatures (e.g., or SST or some other proxy for indoor coil temperature) that the climate control system may operate within based on other parameters or control schemes (e.g., such as indoor humidity control). In some embodiments, an upper limit of each indoor coil temperature range may be dictated entirely or primarily by the user's efficiency versus comfort selection within selection option 204, and the lower limit of each indoor coil temperature range may be dynamically dictated by the desired dehumidification of the indoor space. For instance, an indoor coil temperature may be reduced so as to ensure that the indoor coil temperature is sufficiently below the dew point of the air flowing through the indoor heat exchanger 108 and therefore condense out enough moisture to achieve a desired indoor relative humidity (which may also be selected by a user during operations).

In some embodiments, a controller or controllers of the climate control system (e.g., controllers 106, 124, 126, 142, 144, 138 and/or 250) may enable or disable the decreases of the indoor coil temperature (e.g., or SST or other proxy) for user comfort and/or efficiency purposes. Specifically, in some embodiments, the selections 212, 213 may cause a controller or controllers of a climate control system to not control for a generally reduced indoor coil temperature, so as to increase operational efficiency, and the selections 214, 215, 216 may cause a controller or controllers of a climate control system to control for a decreased indoor coil temperature so as to generally increase occupant comfort. In some embodiments, a controller or controllers of climate control system 100 may apply a fixed and predetermined decrease in the indoor coil temperature (e.g., by a set decrease in the speed of indoor fan 110, and/or a set increase in the speed of compressor 116) when such a control operation is enabled (e.g., at selections 214, 215, 216 as mentioned above). In some embodiments, a controller or controllers of climate control system 100 may dynamically determine a target temperature value or range for indoor coil 109 based on a user selection (e.g., selections 212-216) within selection option 204 as well as other system parameters (e.g., current and/or desired relative humidity within indoor space 10, outdoor ambient temperature and/or humidity, compressor speed, current and/or desired indoor temperature, etc.).

Operational Stage Actuation

Referring again to FIGS. 1-3, in some embodiments, a user placement of the indicator 240 within selection option 206 and/or a user placement of the indicator 220 within selection option 204 may cause the climate control system 100 (e.g., via one or more of the controllers 106, 124, 126, 142, 144, 138 and/or 250), to alter or adjust a stage progression for the climate control system 100 during a heating mode or cooling mode operation. In particular, climate control systems (e.g., such as climate control system 100 in FIGS. 1 and 2) may have a plurality of operational stages that may be associated with higher rates of operation for certain components (e.g., such as a revolutions per minute of compressor 116, indoor fan 110, outdoor fan 118, etc.). In addition, the operational stages of a climate control system may also include the use of additional components so as to add additional cooling or heating capacity to the climate control system during operations (e.g., such as auxiliary components 121 previously described above). Generally speaking, during operations, the indoor fan 110 may direct airflow not only across coil 109 but also across auxiliary components 121 so that the auxiliary components 121 (when activated, energized, operational, etc.) may provide additional enthalpy transfer to or from the airflow, as appropriate, prior to discharging the then conditioned air to the indoor space 10. The auxiliary components 121 may be upstream or downstream of indoor heat exchanger 108 with respect to the direction of airflow generated by indoor fan 110. For both heating mode operations and cooling mode operations, the employment of higher operational stages (e.g., whether that includes higher rates of operations for climate control system equipment, or operation of auxiliary components) may be aimed at enhancing occupant comfort (e.g., by heating or cooling at a faster rate to achieve the occupants desired indoor conditions) at the expense of operational efficiency (e.g., since additional power and/or fuel is consumed when the climate control system operates at such higher operational stages).

Thus, during operations, a user selection that is closer to the "more efficient" selections 212, 232 within selection options 204, 206 may cause a controller or controllers of a climate control system (e.g., such as controllers 106, 124, 126, 142, 144, 138 and/or 250 of climate control system 100 in FIGS. 1 and 2) to prevent or avoid operation of the climate control system in the higher, less efficient operational stages. For instance, in some embodiments, within the climate control system 100 in FIGS. 1 and 2, a rotational speed of the compressor 116 may be limited if an "efficient" prioritized selection is made (e.g., selections 212, 213, 232, 233 in FIG. 3). Specifically, in some embodiments, some or all of the selections 212-216, 232-236 within selection options 204, 206 may be mapped to corresponding upper limits for the rotational speed of compressor 116 (and/or indoor fan 110, outdoor fan 118, etc.), or may be mapped to corresponding rotational speed ranges (or stages) for compressor 116 (and/or indoor fan 110, outdoor fan 118, etc.).

In some embodiments, a user selection of the "more efficient," "efficient," or even potentially "balanced" selections along selection options 210, 230 (e.g., selections 212, 213, 214, 232, 233, 234) may cause a controller or controllers of the climate control system 100 to prevent the use or implementation of additional heating or cooling devices or subsystems (e.g., auxiliary components 121). Specifically, as previously described above auxiliary components 121 may include electrically conductive heating coil, a gas-fired furnace, a hydronic system, etc. and that may be utilized to provide additional heating or cooling capacity to the climate control system 100 during operations. However, as previously mentioned above, the use or operation of these auxiliary components 121 may call for additional energy consumption and thus less operational efficiency for the climate control system 100. Thus, a user choice of selections 212, 213 and even possibly selection 214 within selection option 204, and/or selections 232, 233 and even possibly selection 234 within selection option 206 may prevent or restrict the actuation or use of the auxiliary components 121 so as to avoid the loss or drop in operational efficiency during operations.

In some embodiments, a controller or controllers of the climate control system 100 (e.g., controllers 106, 124, 126, 142, 144, 138 and/or 250) may disable the actuation of the additional or auxiliary heating or cooling components 121, or may apply additional or higher decision boundaries so as to discourage or defer actuation of the auxiliary components 121, based on a user selection to promote or emphasize operational efficiency. Conversely, the controller or controllers of the climate control system 100 may enable the actuation of the additional or auxiliary heating or cooling components 121, or may apply lower or less stringent decision boundaries so as to allow actuation of the auxiliary components 121, based on a user selection to promote or emphasize occupant comfort.

In some embodiments, the decision boundaries that are applied by a controller or controllers of climate control system 100 for purposes of allowing, preventing, encouraging, discouraging the use of higher operational states may comprise targets and/or thresholds applied to various system control parameters. For instance, in some embodiments, a controller or controllers of climate control system 100 may adjust a threshold for a set point error reduction rate in order to affect the use (or non-use) of higher operational stages. Generally speaking, the set point error reduction rate may refer to the reduction fraction or percentage of the error between the set point temperature (e.g., the temperature setting on the thermostat, I/O device 107, etc.) and the current temperature of the indoor space 10 for some defined period of time (e.g., an hour, two hours, etc.). For example, during a heating mode operation, if a set point temperature is 70° F., and the current temperature within the indoor space 10 is 64° F., then the total set point error is 6° F. If the climate control system 100 is able to raise the temperature within the indoor space 10 to 67° F. within an hour, this would correspond with a set point error reduction rate of 0.5 per hour, because the total set point error reduction of 3° F. represents a 50% reduction of the initial total set point error (e.g., 6° F.) after one hour.

Thus, in some embodiments, a controller or controllers of climate control system 100 may adjust a limit or threshold of a set point error reduction rate to affect whether and/or how easily such higher operational stages are actuated during operation. Specifically, in some embodiments, a threshold of the set point error reduction rate is compared to an actual measured set point error reduction rate during operations. If the measured set point error reduction rate is below the threshold set point error reduction rate, then the assumption is made that the climate control system is not delivering enough capacity (e.g., sensible capacity) to the indoor space. In response, a controller or controllers of the climate control system 100 may allow or initiate the operation of the climate control system 100 at a higher operational stage in order to increase the capacity (e.g., again sensible capacity). As a result, as the threshold for the set point error reduction rate is increased, the likelihood or frequency of higher operational stage operation is also increased (e.g., because the chances that the measured set point error reduction rate falls below the threshold are also increased). Conversely, as the threshold for the set point error reduction rate is decreased, the likelihood or frequency of higher operational stage operation is also decreased.

Accordingly, a user selection to promote efficiency during a heating or cooling operation (e.g., selections 212, 213, and possibly also selection 214 within selection option 204, or selections 232, 233, and possibly also selection 234 within selection option 206) may cause the controller or controllers of the climate control system 100 to decrease a limit or threshold of the set point error reduction rate. Conversely, a user selection to promote occupant comfort during a heating or cooling operation (e.g., selections 215, 216, and possibly also selection 214 within selection option 204, or selections 235, 236, and possibly also selection 234 within selection option 206) may cause the controller or controllers of the climate control system 100 to increase the limit or threshold of the set point error reduction rate.

In addition, in some embodiments, a controller or controllers of climate control system 100 may operate the climate control system at higher operational stages (e.g., which again may be associated with higher rates of operation of certain climate control system components, and/or the utilization or operation of auxiliary heating or cooling systems as previously described above) based on a desired temperature change rate within the indoor space (e.g., indoor space 10 in FIGS. 1 and 2). Thus, in these embodiments, a user selection to promote efficiency during a heating or cooling operation (e.g., selections 212, 213, and possibly also selection 214 within selection option 204, or selections 232, 233, and possibly also selection 234 within selection option 206) may cause the controller or controllers of the climate control system 100 to limit a desired temperature change rate within the indoor space so as to avoid, discourage, or restrict operating the climate control system at a higher operational stage as previously described above. By contrast, in these embodiments, a user selection to promote occupant comfort during a heating or cooling operation (e.g., selections 215, 216, and possibly also selection 214 within selection option 204, or selections 235, 236, and possibly also selection 234 within selection option 206) may cause the controller or controllers of the climate control system to apply relatively higher temperature change rates so as to allow or encourage the climate control system to operate at higher operational stages as previously described above.

In some specific embodiments, each of the selections 212-216, 232-236 within selection options 204, 206, respectively, may be mapped to specific thresholds for the set point error reduction, temperature change rate, etc. that generally increase as a user makes selections that place higher emphasis or priority to occupant comfort over operational efficiency.

Referring still to FIGS. 1-3, in some embodiments, a particular selection by a user within selection options 204, 206 may further enable or disable a so-called aggressive recovery operation for the climate control system 100 during a heating or cooling operation. For instance, when a climate control system is presented with a large set point change (e.g., such as might occur when an occupant lowers or raises the desired temperature by a relatively large amount), the climate control system may respond by performing an aggressive recovery operation, which allows operating at the highest available operational stage. In some embodiments, a "large set point change," may refer to a set point change that is 3° F. to 5° F. or higher than the current temperature of the indoor space 10; however, other values are contemplated for other embodiments.

As previously described above, operating at a high operational stage may include operating one or more climate control system components (e.g., compressor 116, indoor fan 110, outdoor fan 118, etc.) at a high (or highest) rate, and/or actuating one or more additional auxiliary heating or cooling components 121. Thus, operating at a highest available operational stage may comprise operating at the highest operational stage that is available to the climate control system 100, so as to provide a maximum heating or cooling capacity, to thereby achieve the desired indoor temperature (or other condition change) within a relatively short amount of time. However, as is apparent from the above description, operation at the highest available operational stage may provide a relatively high level of occupant comfort, but may also include a drop in operational efficiency for the climate control system.

Thus, the user selections within selection options 204, 206 in FIG. 3 may, in some embodiments, cause a controller or controllers (e.g., controllers 106, 124, 126, 142, 144, 138 and/or 250) of a climate control system 100 to enable or disable a recovery operation. For example, if a user or occupant moves indicators 220, 240 to a selection that promotes efficiency during a heating or cooling operation (e.g., selections 212, 213, and possibly also selection 214 within selection option 204, or selections 232, 233, and possibly also selection 234 within selection option 206), an aggressive recovery operation may be disabled so as to avoid the drop or less in operational efficiency. By contrast, if a user or occupant moves indicators 220, 240 to a selection that promotes occupant comfort (e.g., selections 215, 216, and possibly also selection 214 within selection option 204, or selections 235, 236, and possibly also selection 234 within selection option 206) an aggressive recovery operation may be enabled so as to avoid the drop or less in operational efficiency.

In some embodiments, a decision to enable an aggressive recovery operation may also cause the controller or controllers of the climate control system to disable a stage inhibition, whereby the controller(s) prevents or restricts operation at higher operational stages in order to promote efficiency as previously described above. Thus, the enablement or disablement of an aggressive recovery operation may coincide with similar controls for inhibiting operational stage increases as previously described above.

Indoor Fan Start/Stop Delay

Referring again to FIGS. 1-3, in some embodiments, a particular selection by a user within selection options 204, 206 may further enable, disable, and/or adjust a delay in starting or stopping the indoor fan 110. Generally speaking, a delay in stopping the indoor fan 110 at the end of a cooling or heating cycle may increase operational efficiency by extracting additional enthalpy transfer after stopping the other components of the climate control system (e.g., the compressor 116). However, a delay in stopping the indoor fan 11 at the end of the a cooling or heating cycle may have a generally negative impact on occupant comfort, because the temperature of air provided to the indoor space 10 may not be sufficiently cool or warm for occupant comfort following the stopping of the other components of the climate control system (e.g., the continued operation of the indoor fan 110 following stopping of the other components of climate control system 100 may cause the conditioned air to be progressively warmer or cooler for a cooling operation or heating operation, respectively).

Conversely, a delay in starting the indoor fan 110 at the beginning of a cooling or heating cycle may generally increase occupant comfort, because the airflow through the indoor heat exchanger 108 (or other heating or cooling component) is prevented until the temperature of the indoor heat exchanger 108 has reached a corresponding temperature for providing suitably cooled/warmed air to indoor space 10. However, a delay in starting the indoor fan 110 at the beginning of a cooling or heating cycle may reduce operational efficiency, because the other components of the climate control system 100 (e.g., other than indoor fan 110) are operating without providing an enthalpy transfer with the air within (or to be provided to) the indoor space 10. Thus, depending on the selections by a user within selection options 204, 206, a controller or controllers of a climate control system (e.g., climate control system 100) may enable or disable an indoor fan 110 start or stop delay in order to promote operational efficiency and/or occupant comfort as desired.

Examples relating to a delayed stop of the indoor fan 110 during a cooling and heating operation of climate control system 100 are now described below so as to illustrate the impacts of such an operation on operational efficiency and occupant comfort. For instance, during cooling mode operation of the climate control system 100 (FIG. 2), stopping of the indoor fan 110 may be delayed so that the indoor fan 110 continues to flow air across the coil 109 of indoor heat exchanger 108 for a time after the compressor 116 ceases to induce a flow of refrigerant through the coil 109. In particular, after the outdoor unit 104 of the climate control system 100 is stopped (e.g., the compressor 116 and outdoor fan 118 are stopped), the refrigerant within the indoor coil 109 is still at a relatively low temperature. Thus, continuing to flow air over the coil 109 after the flow of refrigerant has ceased may allow additional enthalpy to be transferred from the airflow from indoor fan 110 to the coil 109 and refrigerant therein, so that additional operational efficiency is gained from the climate control system 100. However, during these operations, the continued flow of air across the coil 109 may progressively cause the conditioned air discharged into the indoor space 10 to increase in temperature (e.g., since the temperature of the coil 109 begins to rise after the flow of refrigerant therethrough is stopped), thereby decreasing occupant comfort.

During a heating mode operation of the climate control system 100 (FIG. 1), stopping of the indoor fan 110 may be similarly delayed so that the indoor fan 110 continues to flow air across the coil 109 of indoor heat exchanger 108 for a time after the compressor 116 ceases to induce a flow of refrigerant therethrough in generally the same manner as described above for a cooling operation. The continued flow of air over the coil 109 may allow for additional enthalpy to be transferred to the conditioned air discharged to the indoor space, so that additional operational efficiencies are gained. However, the continued airflow also produces a progressively cooler air into the indoor space (e.g., since the temperature of the coil 109 begins to fall after the flow of refrigerant therethrough is stopped), thereby decreasing occupant comfort.

In addition, examples related to a delayed start of the indoor fan during cooling and heating operation of climate control system 100 are now described below, so as to illustrate the impacts of such an operation on operational efficiency and occupant comfort. For instance, during a cooling mode operation of the climate control system 100 (FIG. 2), starting of the indoor fan 110 may be delayed for a time after initiating operation of the outdoor unit 104 (e.g., compressor 116 and outdoor fan 118). In particular, after the outdoor unit 104 of the climate control system 100 is initiated (e.g., the compressor 116 and outdoor fan 118 are started), the refrigerant begins flowing within the indoor coil 109, thereby reducing the temperature of the indoor coil 109. Thus, delaying starting of the indoor fan 110 may allow the coil 109 to reach a desired temperature before providing airflow thereacross, so as to avoid providing relatively warm air to the indoor space 10. As a result, delaying starting of the indoor fan 110 may increase occupant comfort (e.g., by avoiding flowing warm air to the indoor space 10 at the beginning of the cooling mode operation). However, because refrigerant is flowing within the indoor coil 109 while the indoor fan 110 is off, a significant portion of the energy utilized to compress the flow of refrigerant during this time is essentially wasted (because limited enthalpy transfer is occurring during this period), so that operational efficiency is decreased.

During a heating mode operation of the climate control system 100 (FIG. 1), starting of the indoor fan 110 may be delayed for a time after initiating operation of the outdoor unit 104 (e.g., compressor 116 and outdoor fan 118). In particular, after the outdoor unit 104 of the climate control system 100 is initiated (e.g., the compressor 116 and outdoor fan 118 are started), the refrigerant begins flowing within the indoor coil 109, thereby increasing the temperature of the indoor coil 109. Thus, delaying starting of the indoor fan 110 may allow the coil 109 to reach a desired temperature before providing airflow thereacross, so as to avoid providing relatively cool air to the indoor space 10. As a result, delaying starting of the indoor fan 110 during a heating mode operation may again increase occupant comfort (e.g., by avoiding flowing cold air to the indoor space 10 at the beginning of the heating mode operation). However, because refrigerant is flowing within the indoor coil 109 while the indoor fan 110 is off, a significant portion of the energy utilized to compress the flow of refrigerant during this time is essentially wasted (because limited enthalpy transfer is occurring during this period), so that operational efficiency is decreased.

The above described impacts of delaying stopping or starting of the indoor fan of a climate control system (e.g., indoor fan 110 in FIGS. 1 and 2) on occupant comfort and operational efficiency are also generally applicable to other embodiments of a climate control system that are not configured as a heat pump (e.g., such as for the climate control system 100 of FIGS. 1 and 2). For instance, delaying the indoor fan may provide similar comfort and efficiency impacts for a climate control system that includes circulating refrigerant between an indoor and outdoor unit for cooling operations (e.g., such as in the manner described above for climate control system 100), but includes either a gas-fired furnace and/or electric heating coil for transferring enthalpy to the airflow produced by the indoor fan for a heating operation. In these embodiments, the delay in starting or stopping the indoor fan for heating mode operations is based on the initiation or ceasing of the flow of combusted flue gases through heat exchanger coils (e.g., in the case of a gas-fired furnace) or the initiation or ceasing of electric current through the heating coils (e.g., in the case of electric heating coils). However, even in these embodiments, the delay in starting or stopping the indoor fan (e.g., indoor fan 110) may have similar impacts to operational efficiency and occupant comfort due to a similar delay or extension to enthalpy transfer during the delay periods as previously described above.

Referring still to FIGS. 1-3, during operations, a user selection within selection options 204, 206 may cause a controller or controllers of climate control system 100 (e.g., controllers 106, 124, 126, 142, 144, 138 and/or 250) to enable/disable and/or increase/decrease a delay in the starting or stopping of the indoor fan 110 relative the starting or stopping of the outdoor unit 104 (or other cooling or heating components of the climate control system as described above) so as to emphasize either occupant comfort or operational efficiency as previously described above. In some embodiments, movement of the indicators 220, 240 toward selections that emphasize operational efficiency over occupant comfort (e.g., selections 212, 213 and possibly selection 214 within selection option 204 and/or selections 232, 233 and possibly selection 234 within selection option 206) may be associated with enabling or increasing a delay in stopping the indoor fan 110 following the stopping of the outdoor unit 104 and disabling or decreasing a delay in starting the indoor fan 110 following the starting of the outdoor unit 104 during a cooling or heating operation. Conversely, in some embodiments, movement of the indicators 220, 240 toward selections that emphasize occupant comfort over operational efficiency (e.g., selections 215, 216 along 210 and/or selections 235, 236 within selection options 206) may be associated with disabling or decreasing a delay in stopping the indoor fan 110 following the stopping of the outdoor unit 104 and enabling or increasing a delay in starting the indoor fan 110 following the starting of the outdoor unit 104 during a cooling or heating operation.

In some embodiments, delay in the starting or stopping of the indoor fan 110 may be a fixed predetermined amount of time (the value of which may be determined by the user selections within selection options 204, 206). In some embodiments, the delay in the starting or stopping of the indoor fan 110 may be variable (or dynamic) and based on other values or parameters of the climate control system 100. For instance, referring generally now to FIGS. 4 and 5, embodiments of methods 300 and 400, respectively, for controlling a delay in the starting or stopping of an indoor blower or fan (e.g., indoor fan 110) of a climate control system (e.g., climate control system 100) are shown. In describing the methods of FIGS. 4 and 5, reference will be made to the climate control system 100 of FIGS. 1 and 2; however, it should be appreciated that the methods 300, 400 of FIGS. 4, 5 may be utilized within other climate control systems (e.g., such as those that are not configured as a heat pump as described above for climate control system 100). In addition, in some embodiments methods 300, 400 (or some portion thereof) may be carried out or performed by a controller of controllers of a climate control system (e.g., controllers 106, 124, 126, 142, 144, 138 and/or 250 of climate control system 100).

Figure 4:
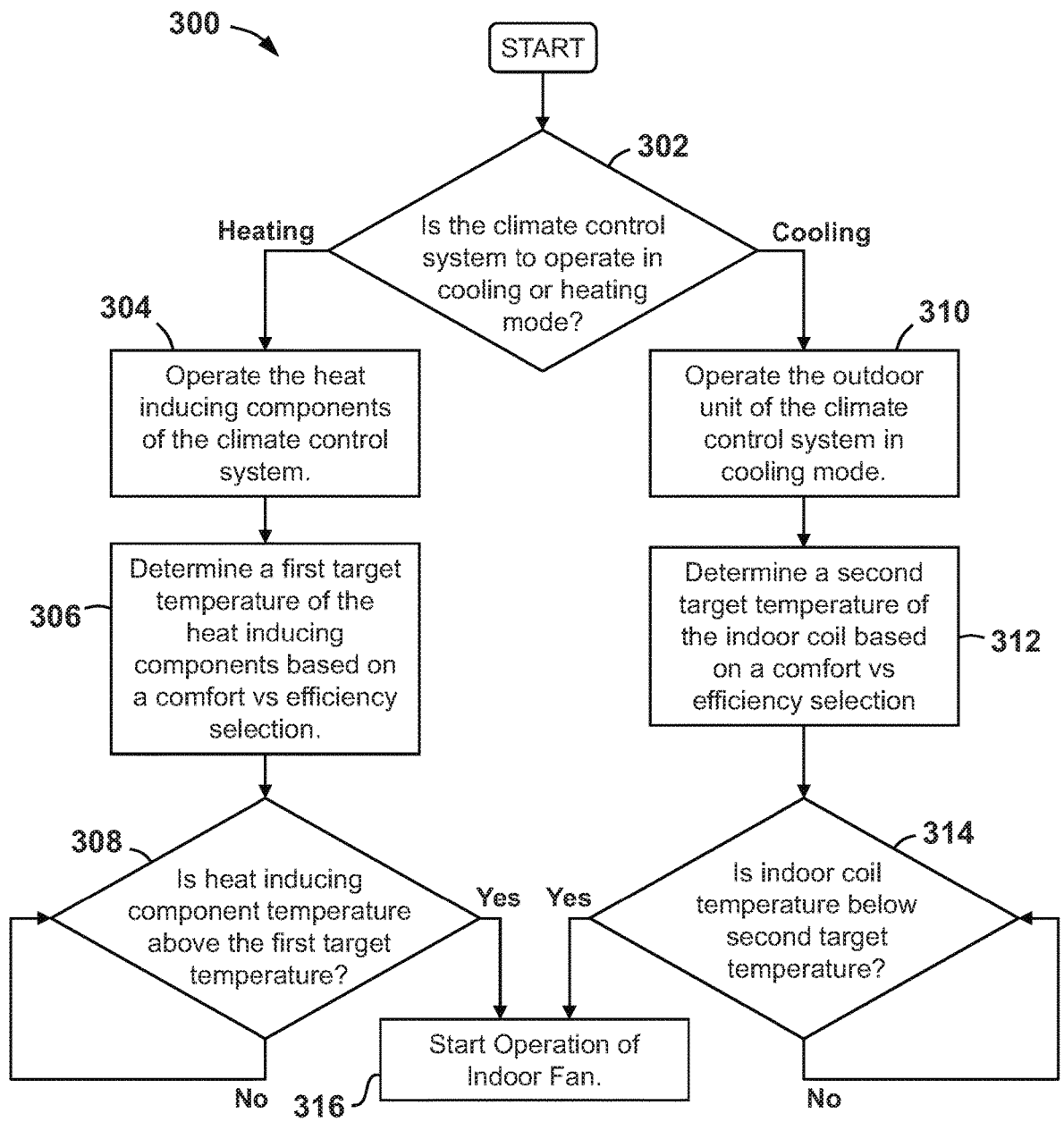
FIG. 4 is a block diagram of a method of delaying the starting of an indoor fan of a climate control system according to some embodiments.

Referring specifically now to FIG. 4, a method 300 of delaying a start of the indoor fan of a climate control system during both a heating or cooling mode operation is shown. Initially, method 300 begins by determining whether the climate control system is to operate in a cooling or heating mode (e.g., such as in the heating and cooling mode operations of climate control system 100 shown in FIGS. 1 and 2, respectively) at block 302. If the climate control system is to perform a heating mode operation, method 300 proceeds from block 302 to block 304. Conversely, if the climate control system is to perform a cooling mode operation, method 300 proceeds from block 302 to block 310.

In particular, if a heating mode operation is to be performed by the climate control system, method 300 proceeds from block 302 to block 304, in which the heat inducing components of the climate control system are operated. In particular, for the climate control system of FIGS. 1 and 2, the heat inducing components may comprise the coil 109 of indoor heat exchanger 108. Thus, operating the heat inducing components at block 304 may comprise actuating the reversing valve 122 to the position of FIG. 1 so as to allow the flow of refrigerant between the indoor unit 102 and outdoor unit 104 to be as previously described above for the heating mode operation, and initiating operation of the compressor 116 and outdoor fan 118. As a result, the flow of refrigerant through the climate control system 100 between the indoor unit 102 and the outdoor unit 104 is initiated as previously described above, and heat energy from the outside environment is transferred into the refrigerant as it flows through the outdoor heat exchanger 114. As the warm refrigerant begins flowing from the compressor 116 into the indoor unit 102, the temperature of the coil 109 within indoor heat exchanger 108 begins to rise; however, the indoor fan 110 is not operating at this time, so that enthalpy transfer from the indoor coil 109 to the air of the indoor space 10 is prevented (or at least restricted).

In other embodiments, the heat inducing components may comprise a heat exchanger tube or tube(s) for receiving combusted flue gases from a burner assembly, an electrically conductive resistive heating coil, etc. Thus, in these embodiments, operating the heat inducing components at block 304 may comprise flowing combusted flue gases through the heat exchanger tube(s) or energizing the resistive heating coil with electric current, etc.

Following the initiation of operation of the heat inducing components at block 304, method 300 proceeds to determine a first target temperature of the heat inducing components based on a comfort vs. efficiency selection at 306. As previously described above, for the climate control system 100 the heat inducing components may comprise the coil 109 of indoor heat exchanger 108. Thus, in some embodiments, block 306 may comprise determining a target temperature for the temperature of coil 109 (or some proxy thereof). As is also previously described above, the SDT of the refrigerant may represent the approximate phase change (e.g., condensation) temperature within the coil 109 during a heating operation. Thus, the SDT may provide an equivalent or close approximation of the indoor coil 109 temperature during a heating mode operation. Accordingly, in some embodiments, block 306 of method 300 includes determining a first target temperature for the SDT.

The value for the first target temperature of the heat inducing components (e.g., or the SDT in some embodiments) determined at block 306 may correspond with the user selection within selection option 206 in FIG. 3. Specifically, selections that emphasize occupant comfort over operational efficiency (e.g., selections 235, 236 within selection option 206) may be associated with progressively higher target temperatures of the heat inducing components (e.g., such as higher values of SDT) so that a delay in starting the indoor fan is generally increased (to therefore provide relatively warmer starting discharge air temperature upon starting the indoor fan 110). Conversely, selections that emphasize operational efficiency over occupant comfort (e.g., selections 232, 233 within selection option 206) may be associated with progressively lower target temperatures of the heat inducing components (e.g., such as lower values of SDT) so that a delay in starting the indoor fan is generally decreased (to therefore decrease the amount of time the outdoor unit 104 is operating without transferring enthalpy to the indoor space 10). In some embodiments, selections within selection option 206 that emphasize operational efficiency may be associated with simply disabling or preventing any delay in the indoor fan so that the indoor fan starts at the same time (or at substantially the same time) as the heat inducing components of the climate control system (e.g., the compressor 116 and outdoor fan 118 of climate control system 100).

Returning to FIG. 4, once the first target temperature is determined at block 306, method 300 proceeds to determine whether the heat inducing component temperature is above the first target temperature at 308. If, the heat inducing component temperature is not above the first target temperature at block 308, the determination in block 308 is again repeated. If, on the other hand, the heat inducing component temperature is above the first target temperature at 308, the method 300 proceeds to start the operation of the indoor fan at block 316 (e.g., indoor fan 110 in FIGS. 1 and 2) so as to initiate the flow of warm discharge air to the indoor space 10.

If, on the other hand, the initial determination at block 302 is that the climate control system is to operate in a cooling mode of operation, then method 300 progresses to block 310, in which the outdoor unit (or other chilling components) of the climate control system is operated in the cooling mode. In particular, for the climate control system of FIGS. 1 and 2, operation of the outdoor unit 104 in the cooling mode includes actuating the reversing valve 122 to the position of FIG. 2 so as to allow the flow of refrigerant between the indoor unit 102 and outdoor unit 104 to be as previously described above for the cooling mode operation, and initiating operation of the compressor 116 and outdoor fan 118.

As a result, the flow of refrigerant through the climate control system 100 between the indoor unit 102 and the outdoor unit 104 is initiated as previously described above, and heat energy from the refrigerant is transferred into the outside environment as it flows through the outdoor heat exchanger 114. In addition, as is also previously described above, as the compressed refrigerant is output from the compressor 116 toward the indoor heat exchanger 102, it flows through the indoor metering valve 112 to controllably expand the refrigerant and therefore decrease the temperature thereof. As the cool refrigerant begins flowing through the indoor unit 102, the temperature of the coil 109 within indoor heat exchanger begins to fall; however, the indoor fan 110 is not operating at this time, so that enthalpy transfer from the air of the indoor space 10 to indoor coil 109 is prevented (or at least restricted).

Following the initiation of operation of the outdoor unit at block 310, method 300 proceeds to determine a second target temperature of the indoor coil based on a comfort vs. efficiency selection at 312. The coil temperature may be directly or indirectly measured, detected, estimated, or inferred. Specifically, referring briefly again to FIG. 1, in some embodiments, the temperature of the coil 109 may be determined at block 310 with the temperature sensor 113 as previously described.

Alternatively, in some embodiments the temperature of coil 109 may be indirectly measured or estimated from other measured values or parameters at 310. For instance, in some embodiments, a pressure of the refrigerant may be measured or detected at any suitable location within climate control system 100 (e.g., within outdoor unit 104, indoor unit 102, etc.), and then the temperature of coil 109 may then be calculated or estimated based on known relationships and variables. Specifically, in some embodiments, pressure sensor 115 may measure a pressure of the refrigerant at the suction side of compressor 116. This measured pressure may be converted (e.g., via a look up table or suitable calculation, etc.) into the SST of the refrigerant at the measured pressure. As previously described above, the SST may provide an equivalent or approximation of the temperature of coil 109 during a cooling operation of climate control system 100 (FIG. 2). Thus, in some embodiments, block 312 of method 300 may comprise determining a second target for the SST of the refrigerant.

The chosen value for the second target temperature of the indoor coil (or SST) at block 312 may correspond with the user selection within selection option 204 in FIG. 3. Specifically, selections that emphasize occupant comfort over operational efficiency (e.g., selections 215, 216 and possibly selection 214 within selection option 204) may be associated with progressively lower target values of the indoor coil temperature so that a delay in starting the indoor fan is generally increased (to therefore provide relatively cooler starting discharge air temperature upon starting the indoor fan 110). Conversely, selections that emphasize operational efficiency over occupant comfort (e.g., selections 212, 213 and possibly selection 214 within selection option 204) may be associated with progressively higher target values of the indoor coil temperature so that a delay in starting the indoor fan is generally decreased (to therefore decrease the amount of time the outdoor unit 104 is operating without transferring enthalpy from the indoor space 10 to the refrigerant). In some embodiments, selections within selection option 204 that emphasize operational efficiency may be associated with simply disabling or preventing any delay in the indoor fan so that the indoor fan starts at the same time (or at substantially the same time) as the outdoor unit (e.g., the compressor 116 and outdoor fan 118).

Returning to FIG. 4, once the second target temperature for the indoor coil temperature is determined at 312, method 300 proceeds to determine whether the indoor coil temperature is below the second target temperature at 314. If, the indoor coil temperature is not below the second target temperature at block 314, the determination in block 314 is again repeated. If, on the other hand, the indoor coil temperature is below the second target temperature at 314, the method 300 proceeds to start the operation of the indoor fan at 316 (e.g., indoor fan 110 in FIGS. 1 and 2) so as to initiate the flow of cool discharge air to the indoor space 10.

Figure 5:
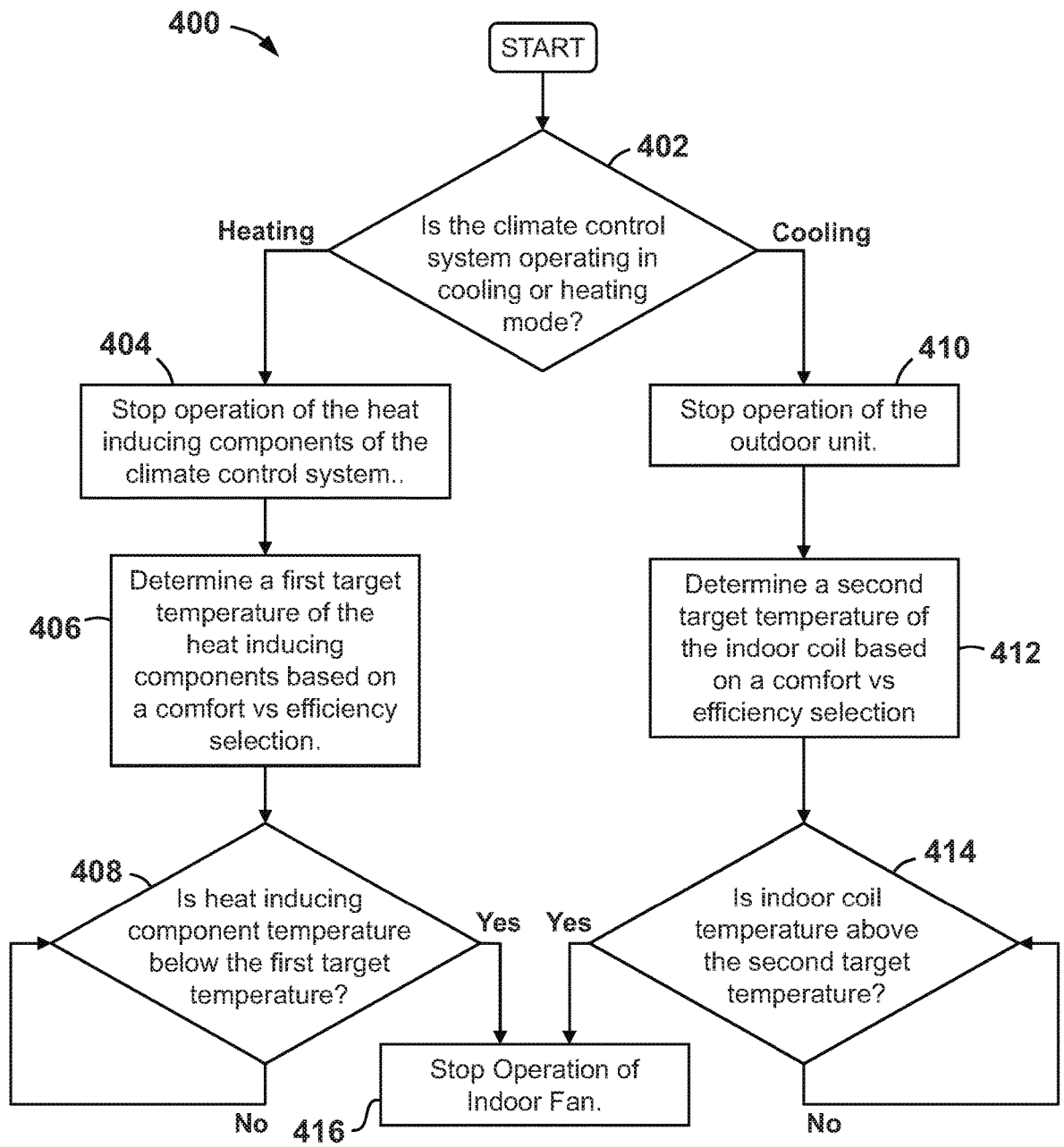
FIG. 5 is a block diagram of a method of delaying the stopping of an indoor fan of a climate control system according to some embodiments.

Referring specifically now to FIG. 5, a method 400 of delaying stopping of the indoor fan of a climate control system during both a heating or cooling mode operation is shown. Initially, method 400 begins by determining whether the climate control system is operating in a cooling or heating mode (e.g., such as in the heating and cooling mode operations of climate control system 100 shown in FIGS. 1 and 2, respectively) at block 402. If the climate control system is performing a heating mode operation, method 400 proceeds from block 402 to block 404. Conversely, if the climate control system is performing a cooling mode operation, method 400 proceeds from block 402 to block 410.

In particular, if a heating mode operation is to be performed by the climate control system, method 400 proceeds from block 402 to block 404, in which the heat inducing components of the climate control system (e.g., coil 109 of indoor heat exchanger 108, heat exchanger tubes of a gas-fired furnace, resistive electrical heating coil, etc.) is stopped. For the climate control system of FIGS. 1 and 2, stopping of the heat inducing components may comprise stopping the compressor 116 and outdoor fan 118 to thereby stop the flow of refrigerant between the indoor unit 102 and outdoor unit 104.

However, due to the previous operation of the climate control system in the heating mode, for a period following the stopping the heat inducing components (e.g., for a period after stopping the flow of refrigerant through the coil 109 of the indoor heat exchanger 108), the temperature of the heat inducing components (e.g., indoor coil 109) is still elevated. Thus, the indoor fan is continued to be operated following stopping of the heat inducing components at block 404 so as to transfer additional enthalpy to the airflow generated by the indoor fan (e.g., indoor fan 110).

Next, method 400 proceeds to block 406 to determine a first target temperature of the heat inducing components based on a comfort vs efficiency selectin at 406. As previously described above, for climate control system 100, the SDT may provide a suitable proxy of the temperature of coil 109 during a heating mode operation (FIG. 1). Accordingly, in some embodiments, block 406 of method 400 comprises determining a first target of the SDT that will provide sufficient enthalpy transfer from the indoor coil 109 to the air so as to provide desirably warm air to the indoor space 10.

The chosen first target temperature value at block 406 (e.g., such as a target SDT) may, correspond with the user selection within selection option 206 in FIG. 3. Specifically, selections that emphasize occupant comfort over operational efficiency (e.g., selections 235, 236 within selection option 206) may be associated with progressively higher target temperature values so that a delay in stopping the indoor fan after stopping operation of the outdoor unit is generally decreased (to therefore avoid providing relatively cool air discharge to the indoor space 10 following stopping of the outdoor unit 104). Conversely, selections that emphasize operational efficiency over occupant comfort (e.g., selections 232, 233 within selection option 206) may be associated with progressively lower target temperature values so that a delay in starting the indoor fan is generally increased (to therefore increase or maximize the amount of enthalpy transferred to the indoor space 10 from the previous operation of the outdoor unit 104). In some embodiments, selections within selection option 206 that emphasize occupant comfort may be associated with disabling or preventing any delay in stopping the indoor fan so that the indoor fan stops at the same time (or at substantially the same time) as the heat inducing components (e.g., the compressor 116 and outdoor fan 118 for climate control system 100).

Returning to FIG. 5, once the first target temperature is determined at block 406, method 400 proceeds to determine whether the heat inducing component temperature is below the first target temperature at 408. If, the heat inducing component temperature is not below the first target temperature at block 408, the determination in block 408 is again repeated. If, on the other hand, the heat inducing component temperature is below the first target temperature at 408, the method 400 proceeds to stop the operation of the indoor fan at block 416 (e.g., indoor fan 110 in FIGS. 1 and 2) so as to stop the flow of discharge air to the indoor space (e.g., indoor space 10).

If, on the other hand, the initial determination at block 402 is that the climate control system is to operate in a cooling mode of operation, then method 400 progresses to block 410, in which the outdoor unit (e.g., compressor 116 and outdoor fan 118) of the climate control system is stopped so as to also stop the flow of refrigerant between the indoor unit 102 and outdoor unit 104 as previously described above. However, due to the previous operation of the climate control system in the cooling mode, for a period following the stopping of the flow of refrigerant through the indoor coil of the indoor heat exchanger (e.g., coil 109 of indoor heat exchanger 108), the indoor coil is still at a reduced temperature. Thus, the indoor fan 110 is continued to be operated following stopping of the outdoor unit at block 408 so as to transfer additional enthalpy from the airflow generated by the indoor fan to the indoor coil (thus, reducing the temperature of the airflow generated by the indoor fan).

Next, method 400 proceeds to block 412 to determine a second target temperature of the indoor coil based on a comfort vs efficiency selection at block 412. As previously described above, the indoor coil temperature may be directly or indirectly determined or measured in the manner previously described above. For instance, in some embodiments, a target value of the SST may be determined as a proxy for a target coil temperature as previously described above.

The chosen value for the second target temperature of the indoor coil (or SST) at block 412 may correspond with the user selection within selection option 204 in FIG. 3. Specifically, selections that emphasize occupant comfort over operational efficiency (e.g., selections 215, 216 and possibly selection 214 within selection option 204) may be associated with progressively lower target values of the indoor coil temperature so that a delay in stopping the indoor fan is generally decreased (to therefore to limit the amount of relatively warmer air to the indoor space 10 following stopping of the compressor 116). Conversely, selections that emphasize operational efficiency over occupant comfort (e.g., selections 212, 213 and possibly selection 214 within selection option 204) may be associated with progressively higher target values of the indoor coil temperature so that a delay in stopping the indoor fan is generally increase (to therefore increase an additional enthalpy transfer between the air flowing to indoor space 10 and the indoor coil 109 following the stopping of compressor 116). In some embodiments, selections within selection option 204 that emphasize operational efficiency may be associated with simply disabling or preventing any delay in stopping the indoor fan so that the indoor fan stops at the same time (or at substantially the same time) as the outdoor unit (e.g., the compressor 116 and outdoor fan 118).

Returning to FIG. 4, once the second target temperature for the indoor coil temperature is determined at 312, method 400 proceeds to determine whether the indoor coil temperature is above the second target temperature at 414. If, the indoor coil temperature is not above the second target temperature at block 414, the determination in block 414 is again repeated. If, on the other hand, the indoor coil temperature is above the second target temperature at 414, the method 400 proceeds to stop the operation of the indoor fan at 416 (e.g., indoor fan 110 in FIGS. 1 and 2) so as to stop the flow of air to the indoor space 10.

Duty Cycle Adjustment

Referring again to FIGS. 1 and 3, in some embodiments, a particular selection by a user within selection options 204, 206 may further enable, disable, and/or adjust a duty cycle of the climate control system 100 or some portion or component thereof. Generally speaking, the duty cycle of a climate control system (or a component thereof) refers to a number of operating cycles of the climate control system (or again some component thereof) per a defined period of time (e.g., an hour, two hours, four hours, etc.). Without being limited to this or any other theory, as the number of heating or cooling cycles per unit time increases (i.e., as the duty cycle of the climate control system increases), the variability of the temperature fluctuations about the desired indoor temperature target are reduced so that the temperature "tightness" about the target value is increased, and occupant comfort is increased. However, the larger number of cycles per unit time may increase the amount of energy consumed by the climate control system to maintain the temperature at or about the desired value and/or may generally increase the amount of time the climate control system 100 operates over a set or fixed period, so that operational efficiency is generally decreased.

Conversely, as the number of heating or cooling cycles per unit time decreases (i.e., as the duty cycle of the climate control system decreases), the temperature tightness about the target value decreases (so that the temperature variability about the target indoor temperature value generally increases), and occupant comfort is generally decreased. However, the smaller number of cycles per unit time may decrease the amount of energy consumed by the climate control system to maintain the temperature at or about the desired value and/or may generally decrease the amount of time the climate control system 100 operates over a set or fixed period, so that overall energy usage and operational efficiency is generally increased.

In some embodiments, increasing the duty cycle of a climate control system during cooling mode operations may also decrease the climate control system's ability to lower humidity within the indoor space. For instance, within the climate control system 100 of FIGS. 1 and 2, during a cooling operation, the temperature of indoor coil 109 is decreased, and may, in some circumstances fall below the dew point of the air flowing within the indoor space 10 (e.g., the airflow generated by indoor fan 110). As a result, water is condensed out of the airflow from indoor fan 110 onto the coils 109 of indoor heat exchanger 108 so as to generally lower a humidity of the conditioned air discharged back into the indoor space 10. Generally speaking, as the operating time of a particular cooling cycle increases, the amount of water that may be condensed from the airflow increases (e.g., because the amount of time coil 109 spends below the dew point is increased). If a duty cycle of the climate control system 100 is increased, the number of cooling cycles may be increased per unit time (e.g., per hour) but will be of relatively short duration. Thus, the raising of a duty cycle of a climate control system (e.g., climate control system 100 in FIGS. 1 and 2) may decrease temperature variability within the indoor space, but will generally decrease the dehumidification function of the climate control system. As a result, in some embodiments, a duty control cycle adjustment or control may not be affected by a user selection within selection option 204 in FIG. 3 (e.g., during a cooling mode operation).

During operations, a user selection that is closer to the "more efficient" selections 212, 232 within selection options 204, 206 may cause a controller or controllers of a climate control system (e.g., such as controllers 106, 124, 126, 142, 144, 138 and/or 250 of climate control system 100 in FIGS. 1 and 2) to decrease a maximum number of cycles per unit time. Conversely, a user selection of that is closer to the "more comfort," selections 216, 236 within selection options 204, 206 may cause a controller or controllers of the climate control system to increase a number of cycles per unit time. For instance, in some specific embodiments, the selections 212, 213, 214, 215, 216 within selection option 204, and the selections 232, 233, 234, 235, 236 within selection option 206 may have the following duty cycle parameters as shown in Table 1 below.

TABLE 1

| Selection | Climate Control System Cycles Per Hour. |
|---|---|
| More Efficient (e.g., selections 212, 232) | 2 |
| Efficient (e.g., selections 213, 233) | 2.75 |
| Balanced (e.g., selections 214, 234) | 3.5 |
| Comfort (e.g., selections 215, 235) | 4.25 |
| More Comfort (e.g., selections 216, 236) | 5 |

As previously described above, in some embodiments, the duty cycle of a climate control system may be measured, tracked, and/or determined based on a duty cycle of one or more components of the climate control system. For instance, with reference to the climate control system 100 of FIGS. 1 and 2, in some embodiments, the duty cycle of climate control system 100 may be determined as the duty cycle of the compressor 116. Thus, during operations, a controller or controllers of the climate control system 100 (e.g., controllers 106, 124, 126, 142, 144, 138 and/or 250) may control a duty cycle of the compressor 116 so as to affect a control over the duty cycle of the climate control system 100 as a whole.

The embodiments disclosed herein include systems and methods for operating a climate control system so as to provide an untrained, occupant or user of the climate control system, the ability to make desired changes to the operational parameters or controls of the system so as to promote efficient operation, comfort, or a combination or balance thereof (e.g., selections 212-216, 232-236 selection options 204, 206, respectively). As previously described, the systems and methods may allow a user to make a relatively small number of intuitive selections that then trigger or actuate a plurality of operational changes within the climate control system all with a mind toward prioritizing the user's desired operational mode (e.g., again efficient operation, comfortable operation, a combination, etc.). Accordingly, through use of the disclosed system and methods, user interaction and customization of climate control system operation may be enhanced.

While the display 200 of FIG. 3 has shown two separate selection options 204, 206 for cooling, heating operations, respectively, it should be appreciated that other embodiments may include a single selection option including a plurality of selections for emphasizing occupant comfort and/or operational efficiency in the manner described above. However, in these embodiments, the single selection option may be utilized to adjust the operational scheme for both the heating mode operation and the cooling mode operation. Thus, a single selection (e.g., such as a selection to emphasize operational efficiency) by a user within the selection option may be utilized by a controller or controllers of the climate control system 100 to adjust operating parameters or schemes of both the cooling mode operation and the heating mode operation generally in the manner described above.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A climate control system comprising:
a heat exchanger configured to discharge conditioned air to an indoor space;
a display; and
a controller coupled to the display,
wherein the controller is configured to generate an operation selection option on the display, wherein the operation selection option includes a plurality of selections for operating the climate control system based on operational efficiency or occupant comfort within the indoor space, each of the plurality of selections corresponding to at least one of a plurality of target temperatures of the heat exchanger, wherein the plurality of target temperatures each comprise a temperature range, each temperature range including an upper temperature limit and a lower temperature limit,
wherein the controller is configured to set a target temperature of the heat exchanger to one of the plurality of target temperatures, and
wherein the controller is configured to adjust the target temperature of the heat exchanger from a first target temperature to a second target temperature based on a user selection from the plurality of selections, wherein adjusting the target temperature maintains the lower temperature limit and adjusts the upper temperature limit in response to the user selection from the plurality of selections.

2. The climate control system of claim 1, wherein the controller is configured to adjust a temperature of a coil of the heat exchanger based on the second target temperature.

3. The climate control system of claim 2, comprising a fan configured to generate an airflow through the heat exchanger, wherein the controller is configured to adjust a speed of the fan based on the second target temperature.

4. The climate control system of claim 3, comprising a compressor configured to generate a flow of refrigerant through the coil, wherein the controller is configured to adjust a speed of the compressor based on the second target temperature.

5. The climate control system of claim 3, comprising an auxiliary heating component configured to heat the conditioned air, wherein the controller is configured to restrict or allow operation of the auxiliary heating component based on the user selection from the plurality of selections.

6. The climate control system of claim 3, wherein the controller is configured to adjust a start delay of the fan when initiating operation of the climate control system based on the user selection from the plurality of selections, and wherein the controller is configured to adjust a stop delay of the fan when ceasing operation of the climate control system based on the user selection from the plurality of selections.

7. The climate control system of claim 6, wherein:
the controller is configured to start the fan after initiating operation of the climate control system when the coil of the heat exchanger passes a fan start target temperature,
the controller is configured to stop the fan after ceasing operation of the climate control system when the coil of the heat exchanger passes a fan stop target temperature, and
the fan start target temperature and the fan stop target temperature are determined relative to the user selection from the plurality of selections.

8. The climate control system of claim 1, wherein the controller is configured to adjust a number of operating cycles per a unit of time of the climate control system based on the user selection from the plurality of selections.

9. A method of operating a climate control system, the method comprising:
(a) generating an operation selection option on a display, wherein the operation selection option includes a plurality of selections for operating a climate control system based on operational efficiency or occupant comfort within an indoor space, each of the plurality of selections corresponding to at least one of a plurality of target temperatures of the heat exchanger, wherein the plurality of target temperatures each comprise a temperature range, each temperature range including an upper temperature limit and a lower temperature limit;
(b) receiving a selection from the plurality of selections;
(c1) setting a target temperature of a heat exchanger of the climate control system to one of the plurality of target temperatures; and (c2) adjusting the target temperature of the heat exchanger of the climate control system from a first target temperature to a second target temperature based on the selection from the plurality of selections, wherein adjusting the target temperature maintains the lower temperature limit and adjusts the upper temperature limit in response to the user selection from the plurality of selections, wherein the heat exchanger is to discharge conditioned air into the indoor space.

10. The method of claim 9, further comprising (d) adjusting a temperature of a coil of the heat exchanger based on the second target temperature.

11. The method of claim 10, wherein the climate control system comprises a fan configured to generate an airflow through the heat exchanger, and wherein (d) comprises adjusting a speed of a fan based on the second target temperature.

12. The method of claim 11, wherein the climate control system comprises a compressor configured to generate a flow of refrigerant through the coil, and wherein the (d) comprises adjusting a speed of the compressor based on the second target temperature.

13. The method of claim 11, wherein the climate control system comprises an auxiliary heating component configured to heat the conditioned air, and wherein the method comprises restricting or allowing operation of the auxiliary heating component based on the selection from the plurality of selections.

14. The method of claim 11, wherein (d) further comprises adjusting a start delay of the fan when initiating operation of the climate control system based on the selection from the plurality of selections.

15. The method of claim 14, wherein (d) further comprises: starting the fan after initiating operation of the climate control system when the coil of the heat exchanger passes a fan start target temperature.

16. The method of claim 11, wherein (d) further comprises adjusting a stop delay of the fan when ceasing operation of the climate control system based on the selection from the plurality of selections.

17. The method of claim 16, wherein (d) comprises:
(d1) determining a fan stop target temperature of the coil of the heat exchanger based on the selection of the plurality of selections; and
(d2) stopping the fan after ceasing operation of the climate control system when the coil of the heat exchanger passes the fan stop target temperature.

18. The method of claim 9, further comprising (d) adjusting a number of operating cycles per a unit of time of the climate control system based on the selection from the plurality of selections.

19. A non-transitory machine-readable medium including instructions that, when executed by a processor, cause the processor to:
(a) generate an operation selection option on a display, wherein the operation selection option includes a plurality of selections for operating a climate control system based on operational efficiency or occupant comfort within an indoor space, each of the plurality of selections corresponding to at least one of a plurality of target temperatures of the heat exchanger, wherein the plurality of target temperatures each comprise a temperature range, each temperature range including an upper temperature limit and a lower temperature limit; and
(b) adjust a target temperature of a heat exchanger of a climate control system based on a user selection from the plurality of selections, such that:
the processor is to adjust the target temperature of the heat exchanger to a first target temperature if a user makes a first selection from the plurality of selections; and
the processor is to adjust the target temperature of the heat exchanger to a second target temperature if the user makes a second selection from the plurality of selections, wherein adjusting the target temperature maintains the lower temperature limit and adjusts the upper temperature limit in response to the user selection from the plurality of selections.

20. The non-transitory machine-readable medium of claim 19, wherein the instructions, when executed by the processor, further cause the processor to adjust a temperature of a coil of the heat exchanger based on the user selection from the plurality of selections.

21. The non-transitory machine-readable medium of claim 19, wherein the instructions, when executed by the processor, further cause the processor to restrict or allow operation of an auxiliary heating component of the climate control system based on the user selection from the plurality of selections, wherein the auxiliary heating component is configured to heat the conditioned air.

22. The non-transitory machine-readable medium of claim 19, wherein the instructions, when executed by the processor, further cause the processor to:
(c) adjust a start delay of a fan of the climate control system when initiating operation of the climate control system based on the user selection from the plurality of selections; and
(d) adjust a stop delay of the fan when ceasing operation of the climate control system relative to the user selection from the plurality of selections;
wherein the fan is configured to generate an airflow through the heat exchanger.

23. The non-transitory machine-readable medium of claim 19, wherein the instructions, when executed by the processor, further cause the processor to:
(e) adjust a number of operating cycles per a unit of time of the climate control system based on the user selection from the plurality of selections.

* * * * *